(12) United States Patent
Zhao et al.

(10) Patent No.: US 12,517,056 B2
(45) Date of Patent: Jan. 6, 2026

(54) WAVEGUIDE WITH SOLID MICRO-EXTRACTION PHASE FOR RAMAN SPECTROSCOPY

(71) Applicants: UNIVERSITEIT GENT, Ghent (BE); IMEC VZW, Leuven (BE)

(72) Inventors: Haolan Zhao, Deerlijk (BE); Pieter Wuytens, Gentbrugge (BE); Roeland Baets, Bachte-Maria-Leerne (BE)

(73) Assignees: IMEC VZW, Leuven (BE); UNIVERSITEIT GENT, Ghent (BE)

( * ) Notice: Subject to any disclaimer, the term of this patent is extended or adjusted under 35 U.S.C. 154(b) by 342 days.

(21) Appl. No.: 17/919,320

(22) PCT Filed: Apr. 19, 2021

(86) PCT No.: PCT/EP2021/060122
§ 371 (c)(1),
(2) Date: Oct. 17, 2022

(87) PCT Pub. No.: WO2021/209646
PCT Pub. Date: Oct. 21, 2021

(65) Prior Publication Data
US 2023/0152233 A1    May 18, 2023

(30) Foreign Application Priority Data
Apr. 17, 2020 (EP) .................... 20170155

(51) Int. Cl.
*G01N 21/65* (2006.01)
*G01N 33/487* (2006.01)
(52) U.S. Cl.
CPC ........... *G01N 21/65* (2013.01); *G01N 33/487* (2013.01)
(58) Field of Classification Search
CPC ............................ G01N 21/65; G01N 33/487
See application file for complete search history.

(56) References Cited

U.S. PATENT DOCUMENTS

| 2002/0031838 A1* | 3/2002 | Meinhart | G01N 21/7703 |
| | | | 436/514 |
| 2013/0157254 A1* | 6/2013 | Sengupta | G01N 33/54373 |
| | | | 435/7.1 |

(Continued)

FOREIGN PATENT DOCUMENTS

| CN | 103630493 A | * | 3/2014 | |
| WO | WO-2013174387 A1 | * | 11/2013 | ........... G01N 21/658 |

OTHER PUBLICATIONS

Lednev, I.K. (2012. Application of Raman spectroscopy for an easy-to-use, on-field, rapid, nondestructive, confirmatory identification of body fluids. Report US Department of Justice). (Year: 2012).*

(Continued)

*Primary Examiner* — Uzma Alam
*Assistant Examiner* — Mohamed Doumbia
(74) *Attorney, Agent, or Firm* — Workman Nydegger

(57) ABSTRACT

A method and device for detecting the presence of an unbound portion of therapeutic agents in a bodily fluid sample provided in which the bodily fluid includes an endogenous component of geometrical size larger than the therapeutic agent. A photonic integrated circuit has a porous material enrichment layer, a waveguide formed in the enrichment layer, and a blocking means provided on an outer surface of the enrichment layer. The enrichment layer with blocking means is permeable to the unbound therapeutic agent and prevents penetration of the endogenous component into pores of enrichment layer. The blocking means is configured to cooperate with the enrichment layer to maintain therapeutic agent access to the pores of the enrichment layer and prevent light-matter interaction between the at least one endogenous component and light guided in the (Continued)

waveguide, when contacting the liquid sample with the photonic integrated circuit.

20 Claims, 6 Drawing Sheets

(56) References Cited

U.S. PATENT DOCUMENTS

2017/0292914 A1* 10/2017 King .................. G01N 21/6428
2018/0372613 A1 12/2018 Hutter
2020/0003619 A1* 1/2020 Hu .......................... G01N 21/65

OTHER PUBLICATIONS

Kauffmann (Nov. 2013, Raman probe for the simultaneous measurement of anion concentration in mixtures of salt solutions. In Sensors, 2013 IEEE (pp. 1-4). IEEE.) (Year: 2013).*

Diez-Silva, M., Dao, M., Han, J., Lim, C.T. and Suresh, S., 2010. Shape and biomechanical characteristics of human red blood cells in health and disease. MRS bulletin, 35(5), pp. 382-388. (Year: 2010).*

(Nsairat, H., Khater, D., Sayed, U., Odeh, F., Al Bawab, A. and Alshaer, W., 2022. Liposomes: Structure, composition, types, and clinical applications. Heliyon, 8(5).)) (p. 14, line 30-35), p. 5, line 30-35; p. 6, line 6, line 1-3 (Year: 2022).*

Dieussaert, "Nanophotonic waveguide enhanced Raman spectroscopy for therapeutic drug monitoring", Dissertation, Jan. 4, 2020, pp. 1-99, Ghent, Belgium.

Wang, "Restricted access magnetic materials prepared by dual surface modification for selective extraction of therapeutic drugs from biological fluids", Journal of Magnetism and Magnetic Materials, vol. 324, Issue 4, Jun. 7, 2011, pp. 410-417.

Extended European Search Report from corresponding European Patent Application No. 20170155.4, Sep. 21, 2020.

International Search Report from corresponding PCT Application No. PCT/EP2021/060122, Jul. 1, 2021.

* cited by examiner

WAVEGUIDE WITH SOLID MICRO-EXTRACTION PHASE FOR RAMAN SPECTROSCOPY

FIELD OF THE INVENTION

The present invention generally relates to the field of detection methods and systems for therapeutic substances in bodily fluids such as blood, and more particularly relates to waveguide assisted Raman spectroscopy methods and systems for drug detection in bodily fluids.

BACKGROUND OF THE INVENTION

Raman spectroscopy is a well-known technique for qualitative and quantitative analysis of the chemical composition of a sample, which uses inelastic light scattering information on a laser-beam-illuminated sample to identify rotation-vibrational transitions in molecules contained in the sample. Of particular interest are the Raman shifts associated with vibrational normal modes of sample molecules, which allow the study or identification of atomic bonds therein. The components in the Raman spectrum for an unknown sample composition can be compared to known Raman lines of a catalog to detect the presence of specific atomic bonds or functional groups in the sample. Eventually, the presence of a molecular species in the sample is inferred from the various identified bonds or functional groups.

The very weak Raman cross-section typical of molecules, with an order of magnitude about $10^{-30}$ $cm^{-2}$ $sr^{-1}$ (e.g. about one thousand times weaker than Rayleigh scattering), makes the detection of components in the Raman spectrum challenging in terms of required laser intensities and/or number densities of the investigates molecules.

In lens-based Raman spectroscopy systems monochromatic laser light is focused onto a small spot on the sample, where the obtained optical intensities are sufficiently high to collect a measurable number of inelastically scattered Raman photons in the detection optics. Long integration times of tens of minutes to hours are typically needed to obtain a significant number of Raman photon counts. These systems are slow and difficult to scale up to allow the study of a large number of samples in parallel, which makes them unattractive for use in clinical laboratory environments or in point-of-care testing.

In waveguide-based Raman sensors and spectroscopy systems strong light confinement is obtained for laser light coupled to and propagating along a waveguide, typically an integrated waveguide in a high index contrast photonic integrated circuit (PIC). Low-loss waveguide materials are available to alleviate the loss-limited effective interaction length. As a result, light-matter interaction can be advantageously enhanced by increasing the interaction length along the waveguide, hence increasing interaction volume without losing the high intensities typically obtained in the focal region of a lens-based system. Waveguide-based Raman spectroscopy systems have the further advantage of being scalable and compact, making them more attractive for use in laboratories and point-of-care testing. At present, the acquisition times are still too long for rapid and high-throughput sample testing. In addition thereto, other components of the fluid sample may approach and dwell nearby, or may even be trapped on, the waveguide surface due to surface adsorption and/or the strong light intensity gradients there. These fluid components increase the light scattering loss of the waveguide and interfere with the Raman spectrum of the target molecule.

Photonic integrated circuits comprising high-index contrast waveguides provide a compact and portable device for sensing, which is also capable of sensing fluids or operating in a fluid environment to which the waveguide is subject. The evanescent tail of the guided light excites the rotation-vibrational transitions and Raman scattered photons can be captured and carried on by the waveguide.

Another disadvantage of these Raman spectroscopy systems is that the target analytes often interact with fluid sample components of a complex matrix, for example blood or plasma. The above-mentioned Raman spectroscopy systems cannot distinguish between an unbound portion of target analytes, which are not bound to a component of the sample (typically protein), and a bound portion of the target analyte, which is bound to a component of the sample. However, only the unbound portion of the target analyte is of interest in most drug monitoring applications, because the analyte loses its therapeutic effect upon binding to the other fluid components.

SUMMARY OF THE INVENTION

It is an object of embodiments of the present invention to provide enhanced light-matter interaction volumes and improved selectivity and detectability of an unbound portion of a therapeutic agent in waveguide-based Raman spectroscopy of liquid samples comprising the therapeutic agent and a complex bodily fluid matrix.

The above objective is accomplished by a method and device according to the present invention.

Embodiments of a first aspect of the invention are directed to a photonic integrated circuit (PIC) for assisting in the detection of the presence and/or concentration of an unbound portion of therapeutic agents in a bodily fluid sample, not bound to proteins if present in the bodily fluid, the bodily fluid comprising at least one endogenous component having a geometrical size larger than a geometrical size of the therapeutic agent. The PIC comprises a porous material enrichment layer, a waveguide that is at least partially formed in the enrichment layer, and a blocking means provided on an outer surface of the enrichment layer. The enrichment layer with blocking means is selectively permeable to facilitate penetration of the unbound portion of the therapeutic agent. Further, the waveguide is configured for inducing enhanced light-matter interaction between light guided in at least one optical mode of said waveguide and the unbound portion of the therapeutic agent in the enrichment layer, and further for collecting scattered light, resulting from said enhanced light-matter interaction, in said waveguide. The blocking means is cooperating with the enrichment layer to maintain therapeutic agent access to the pores of the enrichment layer and prevent light-matter interaction between the at least one endogenous component and light guided in the waveguide, by hindering an adhesion of said endogenous component to a liquid-receiving surface of the enrichment layer with blocking means, which liquid-receiving surface is adapted for contacting the bodily fluid sample.

In other words, the liquid-receiving surface of the enrichment layer with blocking means is anti-adhesive with respect to the endogenous component(s), whereby both an obstruction of the enrichment layer pores by endogenous component(s) adhering to the liquid-receiving surface and a light-matter interaction involving adhered endogenous component(s) is prevented.

Embodiments of the present invention thus provide a waveguide structure which is at least partly implemented in the porous enrichment layer, which is an integral part of the photonic integrated circuit, e.g. a porous enrichment layer permanently formed on a substrate surface of the photonic integrated circuit, and a cladding of the waveguide comprises a liquid-receiving surface adapted for contacting the liquid sample to be analyzed. The liquid-receiving surface has anti-adhesive properties with respect to the at least one endogenous component and repels the at least one endogenous component, but allows the passage of the unbound therapeutic agent(s) and maintains therapeutic agent access to the pores of the porous (over)cladding and, optionally, also to the pores of the waveguide core if the waveguide core is a porous material instead of a solid material. Confined light guided in an optical mode of the waveguide overlaps and strongly interacts with the unbound portion of the therapeutic agent(s) accumulated in the pores of the waveguide structure, giving rise to a strong Raman response signal.

In general, the optical waveguide is a non-planar waveguide structure, different from a slab waveguide. For example, the optical waveguide may be configured as a rib waveguide or ridge waveguide. Such a non-planar waveguide typically has a waveguide core of finite width that raises from an underlying substrate cladding layer and confines light in the two transverse directions of its cross-section, orthogonal to the direction of propagation of the light guided by the waveguide. Moreover, an optical waveguide supporting only a single guided mode, or only a few guided optical modes is preferred.

Preferably, the therapeutic agent is at least one of the group consisting of antibiotics, in particular beta-lactam antibiotics, antiepileptics, immunosuppressants, cardioactive drugs, antifungal drugs, sedatives, psychotherapeutics, chemotherapeutics, anticonvulsants, analgesics, anesthetics. Most preferably, the therapeutic agent is an antibiotic, e.g. a beta-lactam antibiotic.

The bodily fluid may be one of the group consisting of urine, saliva, sputum, whole blood, blood plasma, serum, interstitial fluid, tears, condensed exhaled air. Preferably, the bodily fluid is whole blood, blood plasma, or serum.

In embodiments of the invention, the waveguide thus has at least one optical mode and is configured to guide light in the at least one optical mode such that the guided light interacts with the unbound portion of the therapeutic agent that penetrated and is enriched in the enrichment layer. More specifically, the waveguide is configured to guide light in the at least one optical mode whose associated spatial transverse mode profile overlaps with the part of the enrichment layer in which it is formed, e.g. overlaps at least partly with the porous material enrichment layer of the PIC. The light-matter interaction is enhanced due to the lateral confinement of the guided light (resulting in increased light intensity values), the continued interaction along a propagation direction of the waveguide (resulting in an increased interaction volume), and the enrichment of the unbound portion of the therapeutic agent in the enrichment layer, and preferably includes light scattering from the unbound portion of the therapeutic agent in the enrichment layer, for instance inelastic Raman scattering which generates new light components that are spectrally shifted with respect to the guided light that caused the light-matter interaction and that provide a unique spectral fingerprint of the scattering object (i.e. the unbound portion of the therapeutic agent in the enrichment layer). The waveguide is further configured to collect a portion of the scattered light back into the waveguide, where it is guided towards a photodetection means.

The PIC merely assisting in the detection of the presence and/or concentration of an unbound portion of therapeutic agents in a bodily fluid sample, the photodetection means is an optional component of embodiments of the first aspect, which may be provided as an integrated component of the PIC, or alternatively, as an external component in addition to the PIC.

In embodiments of the invention, the enrichment layer with blocking means is configured to be permeable to the therapeutic agent or agents, i.e. is configured as a semipermeable structure which allows passage of the therapeutic agent(s) to be detected into the enrichment layer but blocks the passage of larger endogenous molecules in the bodily fluid sample, thereby preventing the larger endogenous molecules from diffusing into the enrichment layer. This may be achieved by selecting a mesoporous enrichment layer with adequate pore diameters, which allow the therapeutic agent or agents to penetrate and accumulate in the enrichment layer, but which, at the same time, prevent a fraction of larger-sized endogenous components in the bodily fluid, such as serum proteins (e.g. albumins and/or globulins) or blood cells, from diffusing into the enrichment layer. Depending on the way the bodily fluid sample is obtained and/or prepared, this fraction of larger-sized endogenous components (e.g. expressed in wt. %) may vary. For instance, untreated or unfiltered whole blood as bodily fluid sample contains blood cells and serum proteins, whereas blood serum as filtered bodily fluid sample contains only serum proteins. Here, a larger size of the endogenous component may refer to a larger geometric size as compared to the therapeutic agent or agents, e.g. a larger radius of gyration or hydrodynamic radius.

Preferably, pore diameters of the enrichment layer are in the range from 2 nm to 50 nm, e.g. in the range from 2 nm to 25 nm, e.g. in the range from 2 nm to 15 nm.

A coating as blocking means, in accordance with some embodiments of the invention, generally does not cover the outer surface of the enrichment layer, thus leaving interfacial pores (i.e. pores located at and intersecting the outer surface of the enrichment layer) accessible.

A further porous layer as blocking means, in accordance with same or other embodiments of the invention, may have similar but different pore diameters (e.g. widths) as the pores in the enrichment layer, i.e. the pores of the further porous layer may have larger pore diameters or smaller pore diameters as compared to pores of the enrichment layer, and/or the width of pores in the further porous layer may have gradually varying (e.g. decreasing) diameters in a direction perpendicular to the enrichment layer. Pore diameters of such further porous layer may be in the range from 2 nm to 50 nm, e.g. in the range from 2 nm to 25 nm, e.g. in the range from 2 nm to 15 nm, and can be controlled, for instance, via the surfactant choice or the spinning speed while spin coating the further porous layer in a sol-gel process with surfactant. Preferably, the pore sizes and/or porosity of such further porous layer are adapted to have a smaller effective refractive index than the enrichment layer if the mode overlap with the at least one guided optical mode of the waveguide is not insignificant. A smaller effective refractive index of the further porous layer than for the enrichment layer is not required in embodiments, in which the porous enrichment layer as overcladding is selected thick enough to reduce any mode overlap to an insignificant amount (e.g. less than 1%, e.g. less than 0.1%, e.g. about 0.01%). The further porous layer may be a mesoporous layer and can be formed integrally with the enrichment layer, resulting in a compound bi-layered mesoporous structure as blocking means, in which the enrichment layer constitutes the bottom layer, proximate to the waveguide core, and the further porous layer constitutes the top layer, distal to the waveguide core. Portions of the internal and/or external surfaces of the further porous layer may be functionalized.

In accordance with particular embodiments of the invention, a blocking means may thus comprise the further porous layer and, in combination therewith, a coating provided on the outer surface of the further porous layer, viz. the liquid-receiving surface. Nonetheless, the coating of the blocking means may partly or entirely extend into the pores of further porous layer, thereby coating the internal surfaces of the interfacial pores of further porous layer without obstructing a diffusion path of the therapeutic agent(s) therethrough (diffusion barrier).

It is an advantage of embodiments of the invention that the pore width (e.g. pore diameter) of pores of the enrichment layer can be selected such that they allow the diffusion of the at least one therapeutic agent in its unbound condition into the pores, but prevents larger endogenous components of the bodily fluid from entering the pores and occupying adsorption sites on the pore walls. Therefore, the larger-sized endogenous components are not enriched and cause less Raman signal interference when the PIC is put into operation.

Providing a porous material enrichment layer in accordance with embodiments of the invention has the advantage that the available surface area for adsorption of the at least one therapeutic agent in its unbound condition in the sensitive volume of the PIC is greatly enhanced as compared to a PIC which lacks such a layer (e.g. not present or non-porous), in addition to enhancing the light-matter interaction volume through waveguiding. Therefore, in equilibrium conditions, a large fraction of the unbound therapeutic agent molecules can be removed from the bulk of the liquid sample by adsorption onto the internal pore surfaces of the enrichment layer, whereby a number density of the unbound therapeutic agent molecules is increased in the sensitive volume of the PIC. This further enhances the collected Raman response.

It is an advantage of embodiments of the invention that the adhesion of endogenous components to the outer surface of the enrichment layer is hindered. This greatly limits the number of endogenous components approaching the enrichment layer with the risk of clogging the pores of the enrichment layer when adhering to this layer. Clogged pores would hamper the diffusion of the at least one therapeutic agent in its unbound condition into the pores of the enrichment layer and negatively impact the detectability of the at least one therapeutic agent in its unbound condition. Moreover, a Raman scattering response from those endogenous components collected in the waveguide will be further reduced if they are repelled form the enrichment layer, thus overlapping less with the guided optical mode. For instance, the blocking means may exert a repulsive force, e.g. steric hindrance, on an endogenous component of the bodily fluid if it approaches the outer surface of the enrichment layer too closely, and/or the blocking means may generate a physical and/or energy barrier which is difficult for the approaching endogenous component to overcome and/or is energetically unfavorable, thus deflecting the approaching endogenous component on its trajectory.

In embodiments of the invention the blocking means may comprise a modified portion, e.g. surface-treated portion, of the outer surface of the enrichment layer, or a modified portion, e.g. surface-treated portion, of a further porous layer overlaying the enrichment layer, e.g. in direct contact with the enrichment layer. For instance, a modified portion may correspond to a hydrophilic coating or attached functional polymers. A further porous layer may be beneficial for controlling the hydrophilicity and/or steric hindrance properties of the blocking means, e.g. by controlling the density of attached functional polymers. A blocking means having a hydrophilic coating layer is also improving wettability of the outer surface of the enrichment layer and the sorbtivity into its pores, which promotes the penetration of the at least one therapeutic agent in its unbound condition into the pores of the enrichment layer and reduces the time to reach thermal equilibrium conditions for the adsorption process in the pores. The Raman measurements are preferably performed under equilibrium conditions for which the collected Raman light in the waveguide is strongest.

Preferably, the hydrophilic coating layer comprises or consists of polyethylene glycol (PEG), which confers anti-fouling properties on the blocking means. The PEG molecules are preferably attached covalently to the outer surface of the enrichment layer or to the outer surface of a further porous layer overlaying the enrichment layer. The further porous layer may be a mesoporous layer and can be formed integrally with the enrichment layer, resulting in a compound bi-layered and surface-coated mesoporous structure as blocking means, in which the enrichment layer constitutes the bottom layer, proximate to the waveguide core, and the further porous layer constitutes the top layer, distal to the waveguide core. As an alternative to a coating layer comprising or consisting of PEG, one of the following substances may be used as a coating material for the coating layer: zwitterionic polymers, poly(2-oxazoline)s, poly(hydroxy-functional acrylates), poly(glycerol), poly(vinylpyrrolidone), peptides, and peptoids.

It can be advantageous, in some embodiments of the invention, to apply the coating not only to the outer surface of the further porous layer (i.e. the top layer), but also to the internal surfaces of the pores inside this top layer, without regard to the specific coating material involved. A coating of the external and internal surfaces of the pores in the top layer, i.e. a coating extending over the pores of the entire top layer, has the advantage that the thickness range of the enrichment layer with blocking means, over which an anti-adhesive effect and/or reduced contact angle with respect to endogenous components (e.g. proteins) of the bodily fluid is obtainable, can be increased without having to increase the thickness of the coating layer (i.e. the polymer or oligomer chain length) itself. Keeping the thickness of the coating layer as short as possible, but thick enough to ensure anti-adhesion, is beneficial in view of the reduced time it takes for the therapeutic agent(s) to diffuse through the coating layer. The thickness of the coating layer, e.g. covalently bound PEG, e.g. covalently bound PEG 6/9 molecules (e.g. linear methoxy-terminated PEG 6/9 molecules), may be less than 100 nm, e.g. less than 10 nm, e.g. less than 3 nm, e.g. about 1 nm. The molar mass relative to each one of the polymeric or oligomeric chains constituting the coating layer may be a few kg/mol or less, e.g. less than 5 kg/mol, e.g. less than 1 kg/mol, e.g. about 500-900 g/mol. Moreover, a coating of the top layer which has optimized hydrophilicity is improving the uptake of the therapeutic agent(s) into the bottom layer (i.e. the enrichment layer), where they are sensed by the guided light in the waveguide.

In the preceding embodiments of the invention, the top and the bottom layer, i.e. the further porous layer and the mesoporous enrichment layer, are not restricted to be provided with an identical functional coating on its internal pore surfaces. Preferably, the top and the bottom layer are provided with different functional coatings on its internal pore surfaces; a functional coating of the top layer having at least anti-adhesive effects with respect to aforementioned endogenous components in the bodily fluid, whereas a functional coating of the bottom layer typically provides for specific or preferential binding of the one or more therapeutic agents to the internal pore surfaces of the bottom layer, whereby an enrichment factor of the one or more therapeutic agents is obtainable which exceeds an enrichment factor by mere surface adsorption of the one or more therapeutic agents. It is an advantage of such embodiments that the top and bottom layer can be formed integrally, even at reduced combined thickness values (e.g. less than about 1.0 μm), and also be provided with a wide variety of different internal pore surface coating combinations, leading to different functionalities for the top and bottom layer respectively. As a result, more versatile composite porous layer structures can be obtained more universally Realizing a reduced thickness value of a top layer, which is functionalized differently compared with the bottom layer, has remained a challenge in most prior art approaches, because conventional removal techniques, such as a plasma treatment, tend to penetrate also the underlying bottom layer, underneath the shallow top layer, and negatively affect or destroy the pore surface functionalization of this bottom layer. Dual surface functionalization has been obtained for a restricted class of porous material particles only, relying on specifically developed synthesis recipes, e.g. dual surface-functionalized alkyl diol silica (ADS) particles synthesized via lipase cleavage.

In other embodiments of the invention the blocking means may comprise a porous blocking layer with graded pore widths across its thickness. This has the advantage that nucleation sites for proteins penetrating the porous blocking layer can be controlled and distributed over the sensitive volume such that pore obstruction of the pores of the porous blocking layer by protein precipitation or adhesion is not hampering the diffusion of the at least one therapeutic agent in its unbound condition into the enrichment layer. Moreover, the graded pore widths of the porous blocking layer allow the control of the binding surface energy required by large endogenous components such as cells, e.g. blood cells, for adhering onto an outer surface of the blocking layer exposed to the liquid sample. An energetically unfavorable binding energy will prevent adhesion of these large endogenous components.

According to an embodiment of the invention, the porous material enrichment layer comprises a network of connected mesopores and/or an array of isolated mesopores. The mesopore width can be advantageously selected such that they prevent, or at least hamper, the diffusion of the at least one therapeutic agent in its bound condition into the pores of the enrichment layer. Hence, a contribution of the bound portion of the at least one therapeutic agent to the collected Raman output signal is strongly suppressed.

In some embodiments of the invention, the waveguide may comprise a free-standing portion where it is not supported by the substrate. This has the advantage that the accessible external surface area of the enrichment layer is increased, leading to faster absorption of the at least one therapeutic agent into the pores of the enrichment layer. Furthermore, also the Raman signal collected by the waveguide may be increased as the sensitive volume can be increased by the removal of the substrate, e.g. the guided optical mode of the waveguide can overlap the at least one therapeutic agent also in a region underneath the waveguide, which before has been occupied by the substrate.

It is an advantage of embodiments of the invention that the pore width of a mesoporous enrichment layer can be selected much smaller than a visible or near-infrared wavelength of the light used for illumination, e.g. more than ten times smaller, e.g. more than hundred times smaller, which significantly reduces the amount of Rayleigh scattering losses caused by the pore inhomogeneities overlapping with the guided optical mode of the waveguide. It is particularly advantageous that embodiments of the invention allow waveguiding of illumination light in the visible range for Raman spectroscopy because of the absorption window of water and aqueous solutions, ubiquitous in sensing of bodily fluids, in that wavelength region as compared to the near-infrared or infrared region for instance. Moreover, powerful and cheap laser sources exist in the visible region of the electromagnetic spectrum.

In some embodiments of the invention, the enrichment layer may be patterned to define the waveguide as a porous material waveguide. A porous waveguide core has the advantage that a good mode overlap is achieved with respect to the enriched unbound portion of the at least one therapeutic agent, in particular the mode overlap is achieved at the center of the mode where the optical intensity is highest.

In other embodiments of the invention, the enrichment layer may be overlaying, e.g. covering, the waveguide such that the at least one optical mode of the waveguide extends into said enrichment layer. The waveguide may have a porous core or a non-porous core. Non-porous cores have the advantage that low-loss, high-index contrast materials can be used to achieve good transverse confinement of the optical mode by the waveguide. As a result, the guided optical intensity and obtainable Raman scattering rates are strongly increased. Low optical losses, in particular in the absence of Rayleigh scattering losses by pores in the core, result in longer effective sensing lengths along the waveguide, i.e. larger sensitive volumes for light-matter interaction along the waveguide. Higher refractive index contrast waveguides also allow for more compact PICs in which the waveguide can be bend at smaller radii without excessive losses. Another advantage of having a waveguide material that is different form the porous material of the overlaying enrichment layer is that the optical confinement and mode overlap properties (e.g. Raman light collection efficiency) can be optimized independently of the porous material properties of the enrichment layer. This yields in better design flexibility as compared to porous waveguides that are patterned in the enrichment layer and for which the porosity and/or pore size distribution of the layer strongly determine the mode confinement, effective mode area, effective index and light scattering losses of the waveguide.

According to some embodiment of the invention the internal surfaces of the porous material enrichment layer may be metal coated, in contact with metallic nanocrystals, or functionally coated for reversibly or irreversibly attaching thereto the unbound portion of the therapeutic agent. Metal coated internal pore surfaces or metallic nanoparticles have the additional advantage of increasing the collected Raman signals by virtue of the surface-enhanced Raman scattering effect (SERS). Functionally coated (e.g. peptide, antibodies, functional surface groups) internal pore surfaces have the advantage that they positively enhance selectivity of the PIC by providing adsorption sites that preferentially bind the unbound portion of the at least one therapeutic agent, e.g. a group of target agents used for drug monitoring. Functionally coated internal pore surfaces may have the further advantage of increasing the binding affinity of the unbound portion of the at least one therapeutic agent to the coated internal pore surfaces; thus, at thermal equilibrium, the surface-adsorbed number density of the at least one therapeutic agent in the enrichment layer can be further increased.

Embodiments of a further aspect of the invention are directed to the use of the photonic integrated circuit according to embodiments of the previous aspect in a method for detecting the presence of an unbound portion of therapeutic agents in a bodily fluid sample, not bound to proteins if present in the bodily fluid sample. The method comprises the step providing a liquid sample which comprises a bodily fluid and an unbound portion of a therapeutic agent. The bodily fluid comprises at least one endogenous component that has a geometrical size larger than a geometrical size of the therapeutic agent. In a further step, a photonic integrated circuit according to embodiments of the previous aspect is provided and the liquid sample is contacted with the photonic integrated circuit. In a further step, an unbound portion of the therapeutic agent in the enrichment layer is illuminated by supplying input radiation to the waveguide and light scattered by the therapeutic agent, in response to said illumination, is collected in the waveguide. Next, a plurality of inelastic Raman scattering components or modes are detected in a power spectrum of the light collected by the waveguide. Eventually, a spectral line strength of at least one of the plurality of inelastic Raman scattering components obtained for the therapeutic agent is compared to a predetermined threshold value to determine the presence of the unbound portion of the therapeutic agent.

It is an advantage of some embodiments of the invention that no intensive liquid sample handling and preparation is required as compared to existing Raman spectroscopy techniques or liquid column chromatography techniques. For instance, no further filtering or purification steps may be applied to the liquid sample, e.g. whole blood samples may be used.

According to some embodiments of the invention, a calibration agent may be added to the liquid sample. This has the advantage that the calibration agent acts as an internal standard for the calibration of the PIC. A spectral signal strength of a Raman scattering component of the Raman spectrum that is uniquely identified with a rotation-vibrational transition of the calibration agent may be used to relate signal Raman signal strength to substance concentrations in the liquid sample, for instance by fitting parameter of a calibration model to the spectral signal strength of the calibration agent observed a predetermined volume concentration of the calibration agent in the liquid sample.

According to some embodiments of the invention, the provided liquid sample may comprise a plurality of therapeutic agents and at least one endogenous component of geometrical size larger than a geometrical size of each of the plurality of therapeutic agents. The method steps relating to illuminating, collecting, detecting, and comparing can be performed for each of the plurality of therapeutic agents simultaneously.

According to some embodiments of the invention, a composite Raman spectrum, corresponding to the plurality of inelastic Raman scattering components obtained for the plurality of therapeutic agents, may be decomposed into a plurality of weighted reference spectra in a further step. A relative contribution of each therapeutic agent of the plurality of therapeutic agents to the composite Raman spectrum may then be determined. For each one of said plurality of therapeutic agents, a reference spectrum may have been previously obtained with respect to a liquid sample comprising only that therapeutic agent. The reference spectra may be obtained by way of prior reference measurements performed with the same PIC that used to detect the presence and/or concentration of the at least one therapeutic agent. The reference spectra may also be obtained from a library comprising reference Raman signals obtained from previous measurements of the respective reference liquid samples and/or isolated from such measurements.

According to some embodiments of the invention, the method may further include the step of applying a spectral line strength of at least one of the plurality of inelastic Raman scattering components obtained for a therapeutic agent as input to a calibration model to determine a concentration of the unbound portion of that therapeutic agent in the liquid sample. The calibration model relates the line strength to a corresponding concentration of that therapeutic agent in the liquid sample and takes a diffusion of the unbound portion of the therapeutic agent into the porous material enrichment layer into account. For instance a non-linear parametric curve fitting model may be used as a calibration model, the non-linearity accounting for the diffusion aspect. Other trained calibration models such as partial least square regression may be used to predict concentrations of a plurality of therapeutic agents simultaneously and in an automated way.

According to some embodiments of the invention, contacting the liquid sample with the PIC may comprise flowing the liquid sample over the waveguide, flowing the liquid sample across the waveguide, or immersing the photonic integrated circuit into the liquid sample. A fluidic channel, e.g. microfluidic channel, and a fluid delivery system may be provided for flowing the liquid sample over or across the waveguide. They may be adapted to provide a predetermined volume of the liquid sample. A fluidic channel, e.g. microfluidic channel, and a fluid delivery system may be co-integrated with the PIC to achieve a compact, single device.

It is an advantage of embodiments of the invention that only the presence and/or concentration of the unbound portion of the at least one therapeutic agent can be detected reliably, without interference of the bound portion for which there is no therapeutic effect. Embodiments of the invention are thus useful for drug monitoring applications, e.g. under point-of-care conditions.

It is a further advantage of embodiments of the invention that the acquisition times can be reduced to the order of minutes as compared to hours or tens of minutes required by most conventional free-space or waveguide-based Raman spectroscopy techniques.

It is a further advantage of embodiments of the invention that the background signal and/or time-varying noise caused by the collected Raman scattering events associated with endogenous components in the bodily fluid is strongly suppressed, yielding better selectivity and improved limit of detections for the PIC when detecting the presence and/or quantifying the unbound portion of the at least one therapeutic agent.

It is a further advantage of embodiments of the invention that a wide spectral range of inelastically scattered Raman responses can be detected.

It is a further advantage of embodiments of the invention that calibration models for accurately predicting volume concentrations of one or more monitored therapeutic agents in their unbound condition can be trained to work reliably for a variety of patient-depending blood or plasma compositions.

It is a further advantage of embodiments of the invention that a single waveguide can be used to achieve good selectivity and accurate concentration detection for each one of a plurality of therapeutic agents in parallel. In particular, an array of waveguides in optical communication with a respective enrichment layer with different physical or chemical properties like pore size or pore internal surface coatings is not necessary in order to differentiate reliably between the different therapeutic agents. An array of similar waveguides may be used to further increase the device throughput, e.g. in terms of measured samples or volumes per minute. Furthermore, the waveguide and the enrichment layer of embodiments of the invention can be formed uniformly along the entire waveguide, e.g. can have a uniform cross-section and material composition and properties along the entire waveguide, and do not have to comprise multiple sections of different functionality, e.g. by changing the cross-section and/or material composition and/or material properties along the waveguide, in order to achieve good selectivity and accurate concentration detection for each one of a plurality of therapeutic agents in parallel. This simplifies the manufacture of the PIC and related costs.

It is a further advantage of embodiments of the invention that no controlled temperature variations are required as compared to waveguide-based Raman spectroscopy which uses capillary condensation to differentiate between a plurality of analytes in the gas phase.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
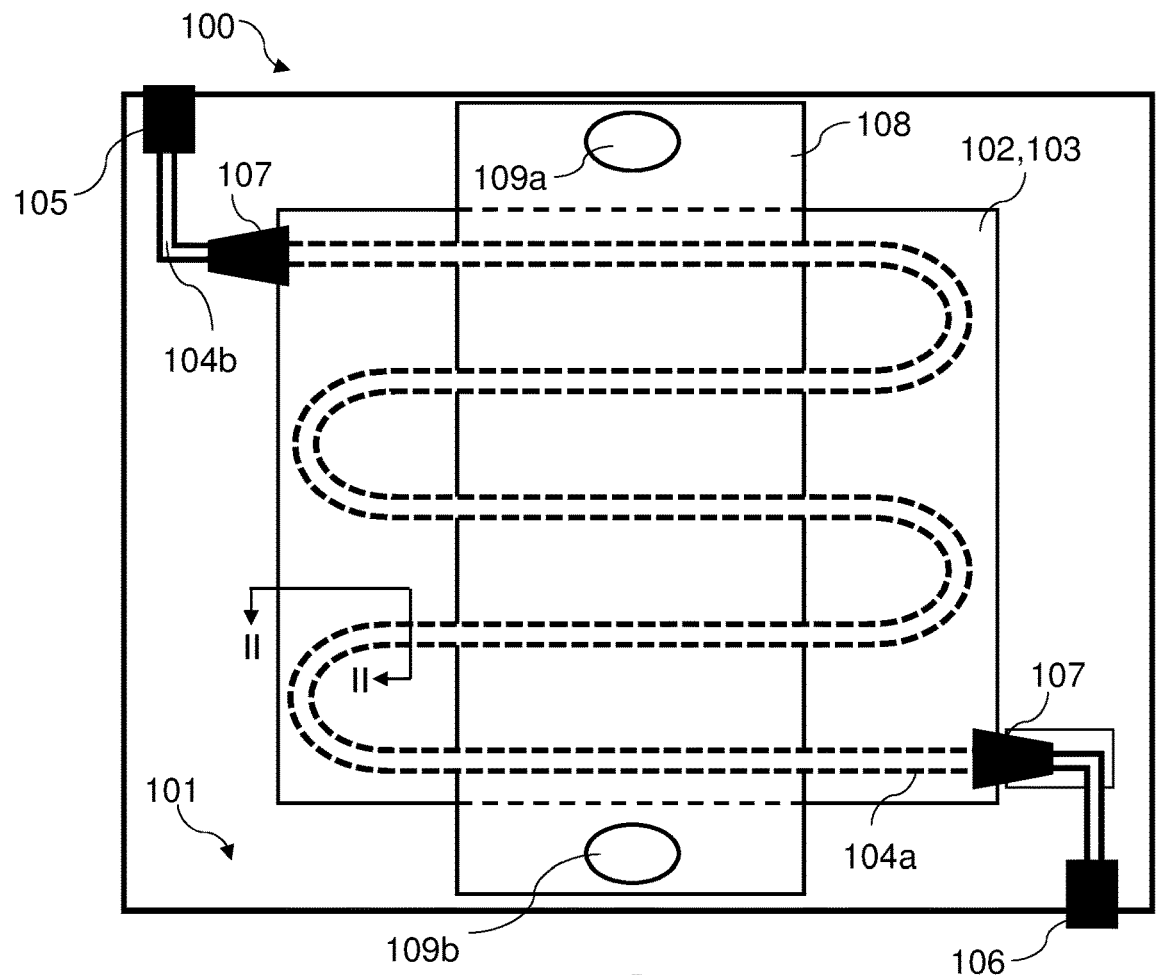
FIG. 1 is top view of a photonic integrated circuit according to a first embodiment of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

Directional terminology such as top, bottom, front, back, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

DEFINITIONS

In the context of the present invention mesopores and mesoporous materials refer to materials having interstices or minute openings through which a fluid (gas, liquid) can pass. The size of pores is typically characterized by the pore width, e.g. the diameter of the pore openings or mouth portion of the pores, which determines the size-exclusion effect with respect to molecules or particles. A width/diameter of a mesopore ranges between 2 nm and 50 nm. The mesopores can have various cross-sectional shapes, for instance hexagonal or quadratic, and varying depths in a disordered network of interconnected pores. In contrast thereto, an ordered array of unidirectional mesopores typically has a well-defined depth.

When reference is made to the "size" of an endogenous component or a therapeutic agent, what is meant is the geometrical size of the object. For endogenous components and therapeutic agents in molecular form, the geometrical size refers to the molecular size, e.g. measured in terms of the twice the hydrodynamic Stoke radius or twice the radius of gyration of the molecule. It is thus possible that a molecule in solution is not capable of penetrating pores of a porous material because of its associated hydration shell, although the physical size of the molecule (in terms of atomic matter belonging to the molecule) may be equal, or even slightly smaller, than the pore width. The molecular size in solution may depend on the pH value of the solution, temperature and other environmental conditions which influence the conformation of large molecules such as proteins. For endogenous components in cellular form, e.g. blood cells, the geometrical size refers to typical dimensions of the shape of these cells. If a geometrical size is pronounced anisotropic, e.g. rod-shaped proteins, the longest dimension shall determine the geometrical size.

When in embodiments of the invention reference is made to the sensitive volume of a photonic integrated circuit, which may also be called sensing volume or detection volume, what is meant is the volume swept out by the effective mode area, associated with a guided optical mode confined by a waveguide of the first waveguide portion, when moving along this waveguide. The effective mode area may be defined as the area delimited by the 1/e contour line describing the exponential decay of the evanescent tail of the guided mode, or the intensity-weighted area integral associated with the optical intensity profile of said guided mode in the cross-section of the waveguide. The porous material enrichment layer is arranged within the sensitive volume and, if used as a waveguide cladding material, may also influence the sensitive volume by its refractive index property.

When in embodiments of the invention a waveguide or waveguide portion is said to be formed or at least partially formed in a layer, for instance in a porous material enrichment layer, this refers to one of the following two cases: a first case in which the waveguide (portion) is extending in this layer such that the layer surrounds and/or covers a contour of the waveguide (portion) and the waveguide material is substituting the material of the layer, or a second case in which the layer is patterned to locally define the waveguide (portion) in this layer, for instance by removing portions of the layer, such that the waveguide material is substantially the same as the material of the layer. The distinction between the two cases may not always be very clear as the example of a diffused or ion-exchanged waveguide shows.

In the following description, the terms functional (surface) coating and surface functionalization (e.g. chemical, by bond formation) are often used interchangeably, unless reference is made to a specific type of surface modification.

A first embodiment of the invention is now described with reference to FIG. 1 and FIG. 2. A photonic integrated circuit 100 comprises a substrate 101 and, formed thereon, a waveguide 104a, 104b. A porous material enrichment layer 102 with blocking means 103 is provided on the substrate 101 and extends at least over a portion of the substrate surface, wherein the blocking means 103 is provided on an outer surface of the porous material enrichment layer 102, facing away from the substrate. The blocking means 103 may correspond to a modified portion of the outer surface of the enrichment layer 102, e.g. a surface treatment of the outer surface of the enrichment layer, e.g. a functional coating or the attachment of functional groups/polymers. Alternatively or additionally, the blocking means 103 may comprise a blocking layer, e.g. a porous blocking layer, in contact with and permanently attached to the outer surface of the porous material enrichment layer 102. A first portion 104a of the waveguide is arranged within the porous material enrichment layer 102. A second portion of the waveguide 104b connects the first portion 104a to an input port 105 and output port 106 respectively. The input and output port 105, 106 may correspond to end facets of the second waveguide portion, or to end facets of the first waveguide portion if the enrichment layer with blocking means 102, 103 covers the waveguide everywhere on the substrate 101. Alternatively, the input and output port 105, 106 may correspond to an aperture of a suitable light coupling means, such as a grating coupler, coupling prism, microsphere lens, etc. Tapered sections 107 may be provided along the waveguide to facilitate a smooth and nearly loss-free transition from the second portion 104b of the waveguide to the first, covered portion 104a, and vice versa. The second waveguide portion 104b, and more generally the substrate region that is not covered by the enrichment layer with blocking means 102, 103, may be covered by a different cladding material, e.g. silica, or may be exposed to air.

Where covered by the enrichment layer with blocking means 102, 103, the first waveguide portion 104a and the porous material enrichment layer 102 define a sensitive volume of the photonic integrated circuit 100. If the first waveguide portion 104a is arranged in a meandering configuration as shown in FIG. 1, a large sensitive volume can be achieved even on a small substrate area. Although not being limited thereto, the first waveguide portion 104a is typically implemented in a compact way, e.g. by adopting a spiraling or folded outline, the latter comprising many straight waveguide sections connected by bent portions. Nonetheless, it is possible to provide the first waveguide portion 104a as a completely straight waveguide portions. Typically, the first waveguide portion 104a has a length ranging from 0.5 mm to 50 mm, yet there is no upper limit on the length, e.g. tens of centimeters long first waveguide portions 104a are feasible.

The outer (exterior) surface of the enrichment layer with blocking means 102, 103 is adapted for receiving a liquid sample comprising a bodily fluid and at least one therapeutic agent. For instance, this outer surface may be exposed, or at least partially exposed (e.g. opened), to be contacted with the liquid sample, e.g. by depositing (e.g. pipetting) or spraying a droplet onto the open portion of the outer surface. The photonic integrated circuit 100 may comprise a protective encapsulation layer as a top layer, in which case an opening, e.g. a hole or trench, may be provided through the encapsulation layer for contacting the exposed portion of the outer surface of the enrichment layer with blocking means 102, 103 to the liquid sample. Alternatively, the photonic integrated circuit 100 may comprise or cooperate with a fluid delivery system. For example, the photonic integrated circuit 100 may interface, at exposed portion of the outer surface of the enrichment layer with blocking means 102, 103, one or more sensing chambers of a microfluidic cartridge, which can be filled with the liquid sample in a controlled way by means of valves arranged between the sensing chamber(s) and a delivery channel of the cartridge. In the present embodiment shown in FIG. 1, the photonic integrated circuit 100 is equipped with a microfluidic channel 108 which crosses the straight sections of the meandering first waveguide portion 104a at ninety degree angles. However, angles of intersection are not limited to ninety degree angles; for instance, the microfluidic channel may have a meandering shape that, when overlaying the waveguide portion 104a, matches and follows the shape thereof. The microfluidic channel 108 portion which intersects the first waveguide portion 104a comprises fluid passages through which the delivered liquid sample is allowed to access the outer surface of the enrichment layer with blocking means 102, 103, e.g. fluid passages including through holes, gaps, slits, fluidic channel without bottom wall. Besides, the microfluidic channel 108 comprises fluid ports, e.g. inlet 109a and outlet 109b, for receiving and draining a liquid sample. Examples of liquid samples, their preparation, bodily fluids and therapeutic agents are described further below.

Figure 2:
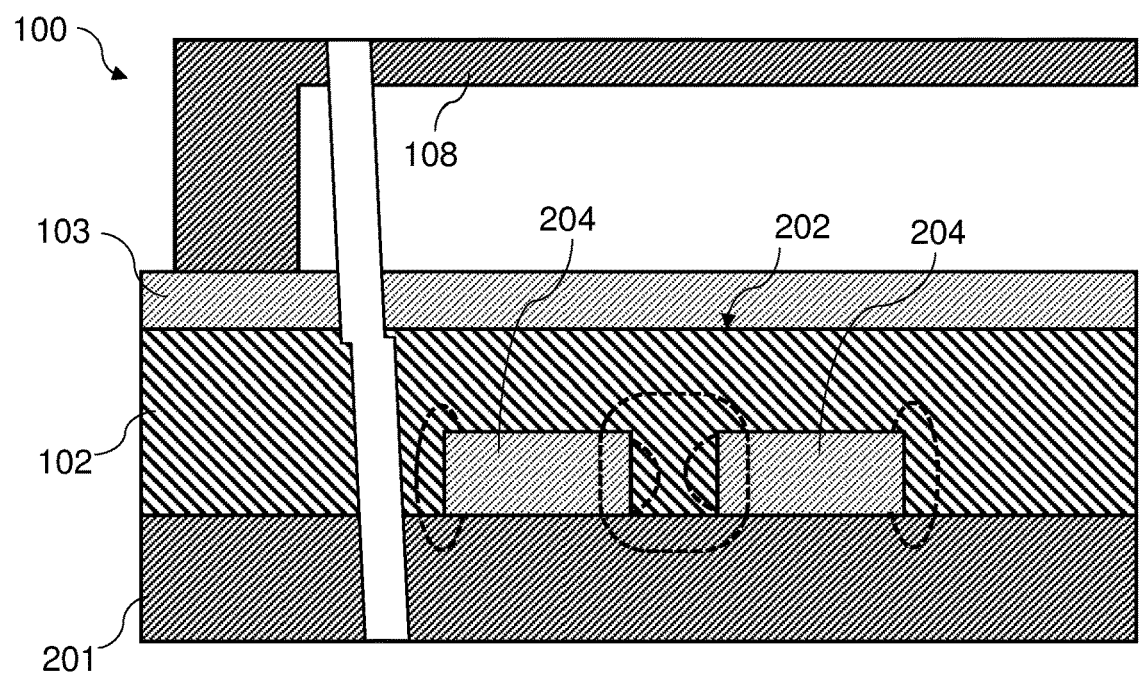
FIG. 2 is a cross-sectional view of the photonic integrated circuit of FIG. 1.

FIG. 2 is a cross-sectional view of the photonic integrated circuit 100 along the line II-II of the first embodiment in FIG. 1, in which the first waveguide portion 104a is provided as a slot waveguide. The slotted waveguide core 204 may have a height between 50 nm and 500 nm, a slot width ranging between 20 nm and 200 nm, and rail widths ranging between 100 nm and 500 nm. It may be made from a CMOS compatible material that is optically transparent in the visible and near infrared region, e.g. silicon nitride based materials. Further waveguide materials that can be used in embodiments of the invention include aluminum oxide, scandium oxide, titanium oxide, tantalum oxide, hafnium oxide, niobium oxide and fluorite optical glasses, e.g. $CaF_2$. The slotted waveguide core 204 is formed on a waveguide support layer 201 of the substrate 101, e.g. a silicon oxide layer, whose refractive index is lower than the refractive index of the waveguide core 204, thereby acting as a lower cladding layer to the slot waveguide. Although not shown in FIG. 2, the substrate 101 typically comprises one or more additional layers, e.g. a semiconductor layer (e.g. silicon) for photonic integrated circuits designed as photonic chips on a wafer. The upper cladding layer to the slot waveguide is formed by the porous material enrichment layer 102, e.g. a porous silica layer, silicate-based layer (e.g. aluminosilicates), or organo-silica layer, having a refractive index that is also lower than the refractive index of the waveguide core 204. Although polymers, e.g. divinyl-benzene and its copolymers, in general show a strong Raman background signal, they may still be used in some embodiment of the invention to implement the porous material enrichment layer 102 if a proper background signal subtraction is performed in the measurements. In embodiments of the invention, the substrate 101 preferably is an insulating substrate, e.g. a silica substrate or a substrate comprising a thick layer of silica. Where the substrate 101 is bearing the first waveguide portion 104a, the substrate 101 may comprise a low-loss, low refractive index material, e.g. silica, acting as a lower cladding of the first waveguide portion. In consequence, light guided by the first waveguide portion 104a is confined into at least one optical mode of the slot waveguide. The intensity profile of such an optical mode is illustrated schematically as dotted lines in the cross section. In embodiments of the invention, good optical mode confinement is obtained in the two transverse directions of a vertical cross-section of the sensitive volume of the photonic integrated circuit, perpendicular to a longitudinal direction of guided light propagation along the first waveguide portion. It can be seen that the at least one optical mode extends into the porous material enrichment layer 102 such that a significant portion of the light intensity residing in the optical mode, i.e. the evanescent tail, is allowed to overlap with pores in the porous material enrichment layer 102, in particular with the pores present in the slot of the slotted waveguide, whereby light-matter interaction with the at least one therapeutic agent, when absorbed into these pores, can take place. Atop of the porous material enrichment layer 102, the blocking layer 103 is provided. The liquid sample, when contacted with the photonic integrated circuit 100, is in fluid connection with the outer surface 202 of the porous material enrichment layer 102 via the intermediate blocking layer 103.

The liquid sample comprises a bodily fluid and at least one therapeutic agent, e.g. a molecule or substance having or causing a therapeutic effect when administered to the body. A bodily fluid, such as whole blood or plasma, constitutes a complex fluid matrix which contains a variety of endogenous fluid components, e.g. erythrocytes, lymphocytes, platelets, hormones, immunoglobulin and glycoproteins in general, as well as water comprising dissolved nutrients and waste products. The therapeutic agent generally interacts with one or more endogenous components of the bodily fluid, which are typically proteins, by binding to a receptor site on these components. Proteins that cause binding of therapeutic agents, e.g. of antibiotics like beta-lactams, are for example serum albumins, e.g. BSA or HSA; they naturally occur in many bodily fluids including whole blood, plasma, serum, exhaled condensed air. Another drug-binding protein class are alpha-1-acid glycoproteins. As a result, the at least one therapeutic agent usually exists in the liquid sample in two different conditions: an unbound portion of the therapeutic agent, which is not bound to a protein, and a bound portion of the therapeutic agent, which is attached to a protein. Only in its unbound condition the at least one therapeutic agent is functionally active, i.e. capable of bringing about the intended therapeutic effect. It is thus an important aspect of therapeutic drug monitoring and detection applications to reliably monitor or detect the presence of only the unbound portion of the at least one therapeutic agent in liquid sample, and more specifically, in the bodily fluid.

The porous material enrichment layer 102 may comprise an array of unidirectionally ordered mesopores or a disordered network of interconnected mesopores, e.g. pores having a pore width ranging between 2 nm and 50 nm, more preferably between 2 nm and 15 nm, e.g. between 2 nm and 8 nm. For this reason, the porous material enrichment layer is selectively permeable to small molecules, having size dimensions smaller than the pore width, and impermeable for large molecules, i.e. molecules with size dimensions exceeding the pore width. At least one endogenous component of the bodily fluid has a geometric size larger than the pore width of the porous material layer, whereas at least one therapeutic agent has a geometric size smaller than this pore width. Therefore, the porous material enrichment layer acts as a sieve for the at least one endogenous component, which is too large to penetrate into the pores of the porous material layer. In contrast thereto, the unbound portion of the at least one therapeutic agent is allowed to penetrate into, and diffuse through, the network of interconnected pores, when the liquid sample is brought into contact with the outer surface 202. For the example of whole blood as bodily fluid of interest, endogenous components that are larger in size than pore widths in the range between 2 nm and 15 nm, e.g. 2 nm to 6 nm, are blood cells like leukocytes, erythrocytes, thrombocytes, but also certain proteins, e.g. the plasma protein fibrinogen or the larger weight glycoprotein thyroglobulin. However, small therapeutic agents in the whole blood, e.g. antibiotic agents such as beta-lactam antibiotics, are not retained by the sifting action of the porous material layer, provided that they are present in the unbound condition. For this particular example, human serum albumin (HSA) behaves as a drug-binding protein with respect to the unbound portion of beta-lactam antibiotics in blood.

The porous material enrichment layer 102 is typically a consolidated material in which pores exist in a rigid macroscopic body of dimensions much larger than those of the individual pores. For instance, the thickness of the porous material enrichment layer 102 may range between 30 nm and 2000 nm. The porous material enrichment layer may comprise a porous silica layer, silicate-based layer (e.g. aluminosilicates), or organo-silica layer. Mesoporous silica offers the advantage of very uniform, and hence well-controlled pore sizes. Further, the porosity of the porous material enrichment layer 102, i.e. the ratio of the volume occupied by the pores to the total volume of the layer, may vary between 10% and 90%. A more than hundred-fold increase in the available adsorption surface area can be obtained in the sensitive volume upon addition of the porous layer enrichment layer as a cladding layer to a non-porous waveguide core. By way of example, a strip waveguide is provided as first waveguide portion, the dimensions of which define the sensitive volume. For a 300 nm high, 700 nm wide and 1 cm long strip waveguide an evanescent tail of the at least one guided optical mode may extend about 200 nm (e.g. 1/e optical intensity decay length) into the porous material enrichment layer as upper waveguide cladding. The sensitive volume is then determined as $(700+400)$ nm$*(300+200)$ nm$*1$ cm$-700$ nm$*300$ nm$*1$ cm$=1.3*10^{-15}$ m$^3$. For a typical overall density of the porous material of about 2000 kg m$^{-3}$ and specific internal pore area of about 1000 m$^2$ g$^{-1}$, the overall internal pore surface area within the sensitive volume amounts to $1.3*10^{-15}$ m$^3*2000$ kg m$^{-3}*1000$ m$^2$ g$^{-1}$=$2.6*10^{-6}$ m$^2$. Compared to the outer surface of a bare strip waveguide of same length and cross-section, not covered by the porous material enrichment layer as upper cladding material, whose outer surface area is $(700+2*300)$ nm$*1$ cm$=1.3\times10^{-8}$ m$^2$, at least a two hundred-fold increase in available adsorption surface area is achieved.

One or more therapeutic agents, to which the porous material enrichment layer 102 is selectively permeable, are driven into the internal pore spaces of porous material enrichment layer 102 by the combined action of capillary driven flow and/or diffusion. In addition to the absorption of the at least one therapeutic agent in its unbound condition into the internal pore spaces of porous material enrichment layer 102, the at least one therapeutic agent is adsorbed at the internal surfaces of porous material enrichment layer 102, e.g. the pore walls. As a result thereof, an increase in the number concentration of unbound and adsorbed therapeutic agent molecules is obtained. An improvement of the detection limit for non-polar molecules in aqueous solution by at least a factor of 100 as compared to bare silicon nitride waveguides has been measured, for instance for cyclohexanone in water, for a silicon nitride slot waveguide having a modified mesoporous silica cladding as enrichment layer (e.g. internal pore wall coating with hexamethyldisilazane), enabling detection limits as little as a few micromolar. The porous material layer 102 thus indeed functions as an enrichment or sorbent layer with respect to the unbound portion of the therapeutic agent. This is to be compared to the situation of a similarly designed, liquid exposed waveguide without porous cladding, only the waveguide walls of which serve as adsorption sites to the therapeutic agent. This enrichment of unbound therapeutic agents in the sensitive volume has the advantage of increasing the Raman scattering rate and hence the number count of inelastically scattered Raman photons recorded by a spectrometer. Besides, the internal surfaces, e.g. pore walls, of the porous material layer may be aptamer-functionalized, antibody-functionalized, or provided with functional groups to enable the specific binding, reversible or irreversible in nature, of an unbound therapeutic agent, or a further substance of interest, to the functionalized internal surfaces with high affinity. This may be of advantage in embodiments, in which only one of a plurality of therapeutic agents present in the liquid sample is to be preferentially selected, sensed and analyzed. It can also be of advantage in embodiments, in which one of the therapeutic agents of interest is labelled, e.g. with a fluorescent dye molecule, or a further labelled substance, e.g. fluorescently labelled, is added to the liquid sample with the purpose of establishing an internal calibration signal, for calibrating the obtained Raman signals. In particular embodiments of the invention, the internal surfaces, e.g. pore walls, of the porous material layer may be metal-coated (e.g. gold or silver coating), or the pore spaces may comprise metallic nanoparticles (e.g. gold or silver nanoparticles). This has the advantage that the effective Raman scattering cross-section, and thus the number of inelastic Raman scattering events, may be greatly enhanced by the surface-enhanced Raman scattering effect (SERS) in the vicinity of metal surfaces that show plasmon resonances at or near the wavelength used for illuminating the waveguide and the porous material enrichment layer comprising the metal coating or metal nanoparticles.

In embodiments of the invention, the porous material enrichment layer 102 may be obtained by a sol-gel deposition and drying process. For instance, a xerogel film may be formed on the substrate and over the first waveguide portion, e.g. by spin-coating or dip-coating it with a colloidal solution, and subsequently dried by heating. Another possibility consists in the deposition of a mesoporous powder comprising nanoscale or microscale particles, e.g. interconnected silica or titanium oxide nanoparticles of various shapes, onto the substrate and first waveguide portion, followed by a heat treatment for sintering (e.g. spark-plasma sintering) the particles into a single macroscopic body. Porous layers, e.g. porous layers of silicon oxide or aluminum oxide, may also be obtained by providing an initial layer of the same unoxidized material, e.g. an initial layer of amorphous silicon or aluminum (e.g. grown by plasma chemical vapor deposition), which is then oxidized in a controlled environment. Yet another way of obtaining the porous material layer consists in providing an initial layer of the same unoxidized material, e.g. an initial layer of monocrystalline silicon or aluminum (e.g. grown by plasma chemical vapor deposition), which is then etched electrochemically to introduce pores of well-controlled widths, and subsequently performing an oxidization step in a controlled environment. The porous material enrichment layer 102 may thus be formed for a variety of photonic integrated platforms, including silicon nitride on insulator (e.g. silicon oxide) photonic integrated technology or semiconductor oxide waveguide platforms.

In yet other embodiments of the invention, the porous layer enrichment layer, or at least a portion thereof, may be obtained by providing a layer, e.g. a silica layer, with a dense arrayed structure of cavities or micropillars formed therein. This arrayed structure may be obtained by wet etching or dry etching with a high aspect ratio, e.g. by deep reactive ion etching (DRIE). In such arrayed microstructures, for instance a dense array of micropillars or a photonic crystal type membrane structure, the cavities (e.g. through holes) or interpillar spaces form the plurality of unidirectional mesopores. For micropillar array structures the pores are interconnected, whereas for the cavities the pores may be isolated. A density of pores may be modulated along the waveguide, which is useful for generating a weak diffractive grating for rejecting undesirable radiation co-propagating along the waveguide at wavelengths other than the wavelength used for illumination. Such a grating may also be provided near the output port of the PIC, which allows the on-chip implementation of a wavelength filter, e.g. to reject Rayleigh scattered light collected by the waveguide. The arrayed structure may be formed in a cladding layer of the waveguide and/or in the core layer of the waveguide. The arrayed structure preferably has sub-wavelength dimensions with respect to a wavelength used for illumination of the waveguide, whereby scattering losses along the waveguide are reduced. A dense arrayed structure of holes in the waveguide may also be filled with a mesoporous material of the enrichment layer, forming a waveguide whose refractive index is controllable and described by an effective medium approach, e.g. Maxwell-Garnett theory. In such an embodiment, the enrichment layer covers and locally extends into the waveguide. This has the advantage that a mode overlap with the porous enrichment layer can be improved, e.g. an evanescent and a non-evanescent center portion of the guided optical mode can overlap with the porous material enrichment layer.

The blocking means, e.g. a blocking layer 103, may correspond to a material layer that is obtained by surface modification of the outer surface 202 of the porous material layer 102. For instance, the outer surface 202 may be functionalized by coating, e.g. spin-coating, a monolayer of polysaccharides, polyamides, polyethylene glycol (PEG), oligoethylene glycol (OEG), or other PEG-based materials to the outer surface 202. Further, zwitterionic polybetaines (e.g. polycarboxylate betaines) or polyampholytes may be used as surface coating materials. These polymeric chains may also be tethered the outer surface 202 by means of self-assembly or grown by atom transfer radical polymerization from a surface-anchored adhesive group. The chain length and chain density on the outer surface 202 can be controlled to steer the surface hydration capability and repulsive forces for preventing protein adhesion and biofouling. The polymer chains of the blocking layer 103 render this layer hydrophilic and water molecules of the liquid sample are attracted via hydrogen bonding (e.g. PEG chains) and/or ionic solvation (zwitterionic interfaces) to form a tightly bound water layer at the interface, which acts as a physical and an energy barrier with respect to an approaching endogenous component, e.g. protein. Fouling of the pores of the porous material enrichment layer 102 opening towards the outer surface 202 may also be prevented by steric repulsion forces that act on a protein temporarily adhering to the blocking layer. The steric repulsion originates form the compressive polymer chain conformation when loaded by a protein. In addition to its antifouling properties, preventing protein adhesion as well as biofilm formation, the blocking layer 103, owing to its hydrophilic condition, also offers good wettability and an increased water flux capacity at least with respect to those pores of the porous material enrichment layer that are adjacent to the blocking layer. This has the advantage of reducing the time required for filling the pores of the enrichment layer by capillary action and for achieving an equilibrium for the adsorption-desorption reactions of the unbound portion of the at least one therapeutic agent at the internal pore surfaces. In some embodiments of the invention, the blocking layer 103 may comprise a multilayer coating comprising an attachment layer for the hydrophilic polymer chains and the hydrophilic polymer layer itself, e.g. a monolayer of polymer chains such as PEG. A suitable attachment layer may be provided by spin-coating another permeable polymer layer, a silica layer without hydroxyl or hydrogen termination, or another porous layer having a different (e.g. smaller or larger) pore width than the pores of the enrichment layer, onto the enrichment layer 102, prior to attaching the functional polymer chains of the blocking layer. Consequently, the overall thickness of the blocking layer 103 may vary widely between embodiments of the invention, e.g. from 1 nm up to 10000 nm. Yet other coating materials suitable for use as a blocking layer 103 may include polydimethylsiloxane or divinylbenzene. In embodiment of the invention, the blocking means, e.g. a blocking layer or outer surface modification or treatment (e.g. functionalization to obtain good hydrophilicity), may be arranged outside or near the edge of the sensitive volume. This has the advantage that the repulsive interactions between the blocking means and the at least one endogenous component do not interfere with the Raman scattering measurements performed with respect to the at least one therapeutic agent absorbed and/or adsorbed inside the porous material enrichment layer.

In a particular embodiment of the invention, another porous layer may be provided as said attachment layer on top of the enrichment layer 102 and this porous attachment layer is permeable to allow the unbound portion of the at least one therapeutic agent to pass through the blocking layer 103. The pores of the porous attachment layer may be of larger width than those of the enrichment layer, but may still be sufficiently small to prevent penetration by the largest amongst the endogenous components in the liquid sample, e.g. blood cells. The porous attachment layer acts as an intermediate substrate for the hydrophilic coating which allows the formation of a less dense attachment of polymer chains as compared to directly attaching these polymer chains to the outer surface of the enrichment layer. This is achieved by the wider pore openings at the interface of the porous attachment layer as compared to the narrower pores of the enrichment layer, leading to a rarefication of the available surface area for attaching polymer chains. This is of advantage because very long polymer chains of the hydrophilic coating may themselves block the narrow pore openings of the enrichment layer and hinder the diffusion of the unbound portion of the at least one therapeutic agent into the enrichment layer. As an intermediate substrate for the hydrophilic coating, the porous attachment layer may be thin compared to the enrichment layer 102 to avoid an excessive imbibition time of the enrichment layer, and further to avoid enrichment of the unbound therapeutic agent in the porous attachment layer, at a larger distance to the first waveguide portion 104a. However, in embodiments of the invention discussed further below, in which the first waveguide portion comprises a porous core, the porous attachment layer may be equally thick or thicker than the height of the porous waveguide core to also act as an upper cladding to the porous waveguide. Besides, the porous attachment layer and the enrichment layer may be formed as a single body in embodiments of the invention which allow the selection of pore widths during manufacture of the porous body comprising the porous attachment layer and porous enrichment layer, e.g. an electrochemical etching process.

A coated blocking layer 103 of the kind just described constitutes a blocking means which is in contact with the outer surface 202 of the porous material enrichment layer 102 and which cooperates therewith to prevent the presence of the at least one endogenous component in or near the porous material enrichment layer 102 and, at the same time, promote the uptake (e.g. increased wettability) of only the unbound portion of the at least one therapeutic agent into the porous material enrichment layer 102. In consequence, the endogenous components of the liquid sample do not reach the sensitive volume of the photonic integrated circuit, e.g. the region of strong overlap of the pores of the enrichment layer 102 with the evanescent tail of the guided optical mode supported by the waveguide portion 104a, whereby a Raman background signal in the scattered light collected by the waveguide portion 104a is strongly reduced. Moreover, the blocking means also prevents, by virtue of its anti-adhesive and repellant properties, the penetration of the bound portion of the at least one therapeutic agent, bound to a protein, as well as of a significant number of other endogenous components, e.g. proteins, with sizes smaller than the pore widths of the enrichment layer 102 into the pores of the enrichment layer 102. This further reduces the Raman background signal and may further improve the limit of detection achievable with the photonic integrated circuit, i.e. the minimally detectable therapeutic agent concentration in the liquid sample. The described blocking means is biocompatible and water permeable, but enjoys better protection against fouling. Fouling, in particular biofouling, is likely to render Raman sensing assisted by the photonic integrated circuit inoperable, because the pores of the enrichment layer 102 with openings located at the outer surface 202 would be obstructed by precipitated proteins, e.g. precipitated proteins which would adhere to the outer surface 202 and crystallize in those pores if the outer surface 202 were not coated by the blocking layer 103. Once the outer pores of the enrichment layer 102 that give access to its interior pore spaces are clogged, the unbound portion of the at least one therapeutic agent cannot reach the sensitive volume of the integrated photonic circuit any longer and Raman sensing becomes impossible. It is therefore an advantage of the present invention that the blocking means prevents clogging of the outward facing pores of the enrichment layer to guarantee good and stable device operation during Raman sensing applications.

An alternative blocking means, which may be combined with a hydrophilic coating as has been described above, comprises a further porous material layer that acts as a blocking layer, e.g. a porous blocking layer. This porous blocking layer is provided on the outer surface 202 of the enrichment layer 102. It comprises a plurality of pores of varying pore width, wherein the pore width is decreased, e.g. continuously or in discrete steps, the closer the pores of the blocking layer are located with respect to the enrichment layer. The pore widths of pores of the blocking layer are smallest where the blocking layer joins, and is connected to, the outer surface 202 of the enrichment layer 102. The smallest pore width of the blocking layer may be equal to, or slightly larger than, the pore width of pores of the enrichment layer. In particular, the smallest pore width of the blocking layer may be adapted such that the blocking layer as a whole is selectively permeable to (only) the unbound portion of the at least one therapeutic agent, but retains one or more endogenous components, e.g. the drug-binding proteins, preventing their diffusion into the enrichment layer. For instance, pore widths may be decreased from 20 nm down to 6 nm. The blocking layer has therefore larger pore widths at the distal side, which receives the liquid sample upon contacting with the photonic integrated circuit, and smaller pore widths at the proximal side, which connects with the outer surface 202 of the enrichment layer 102. The larger pore openings at the distal side of the porous blocking layer hinders larger endogenous components, e.g. blood cells, from adhering thereto because of the unfavorable increase in surface energy. Smaller endogenous components, e.g. proteins, may briefly be adsorbed in the larger pores before being desorbed again; nucleation and subsequent crystallization of smaller endogenous components is indeed more likely to take place in narrow pores having a higher width-depth aspect ratio, decreasing drastically their escape probability. Therefore, smaller endogenous components are adsorbed and/or crystallize not close to the liquid sample receiving distal side, but deeper inside the porous blocking layer where the pore width is reduced. As this happens in the volume of the porous blocking layer, and distributed over the entire length of first waveguide portion, there is no substantial clogging of the porous network in the porous blocking layer that would prevent the unbound portion of the at least one therapeutic agent from reaching and penetrating the enrichment layer. Besides, the endogenous components trapped in the pores of the blocking layer may be released again by performing a rinsing step with water or an organic solvent, optionally at an increased temperature. As mentioned previously, also in this case the porous blocking layer and the enrichment layer may be formed as a single body in embodiments of the invention which allow the selection of pore widths during manufacture of the porous body comprising the porous blocking layer and porous enrichment layer. Moreover, the porous blocking layer may act as an upper cladding to a porous waveguide core, i.e. a first waveguide portion patterned into the porous material enrichment layer, in alternative embodiments of the invention as described hereinbelow with reference to FIG. 6. In embodiments of the invention, a further porous material layer of the blocking means, e.g. a porous blocking layer and/or a porous attachment layer may comprise a porous silica layer, silicate-based layer (e.g. aluminosilicates), or organo-silica layer. Mesoporous silica offers the advantage of very uniform, and hence well-controlled pore sizes.

The combined synergetic effect of the further blocking means and the enrichment layer consists in an improved selectivity of the unbound portion of the at least one therapeutic agent over the bound portion as well as other endogenous components interfering with the Raman spectroscopic measurement. This is achieved without having to further reduce the pore widths for the enrichment layer. A reduced pore width for pores of the enrichment layer would entail a decrease in adsorption surface area available to the unbound portion of the at least one therapeutic agent and also reduce the mobility thereof. A too large increase in the diffusion time constant for the unbound portion of the at least one therapeutic agent and in the time to reach an adsorption equilibrium for the unbound portion of the at least one therapeutic agent, being adsorbed onto the internal pore surfaces, can be inacceptable in view of the resulting longer measurement times and lower sample throughput rate.

Figure 3:
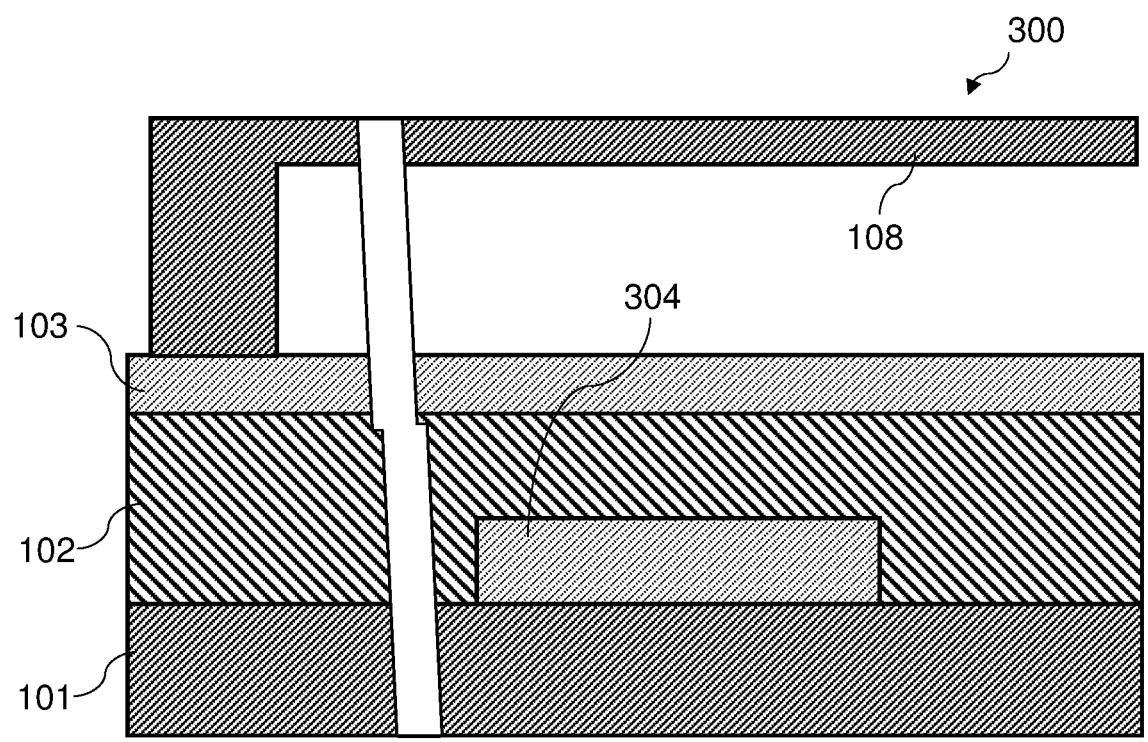
FIG. 3 and FIG. 4 are cross-sectional views of the photonic integrated circuit of FIG. 1, illustrating different waveguide types in accordance with embodiments of the invention.
Figure 4:
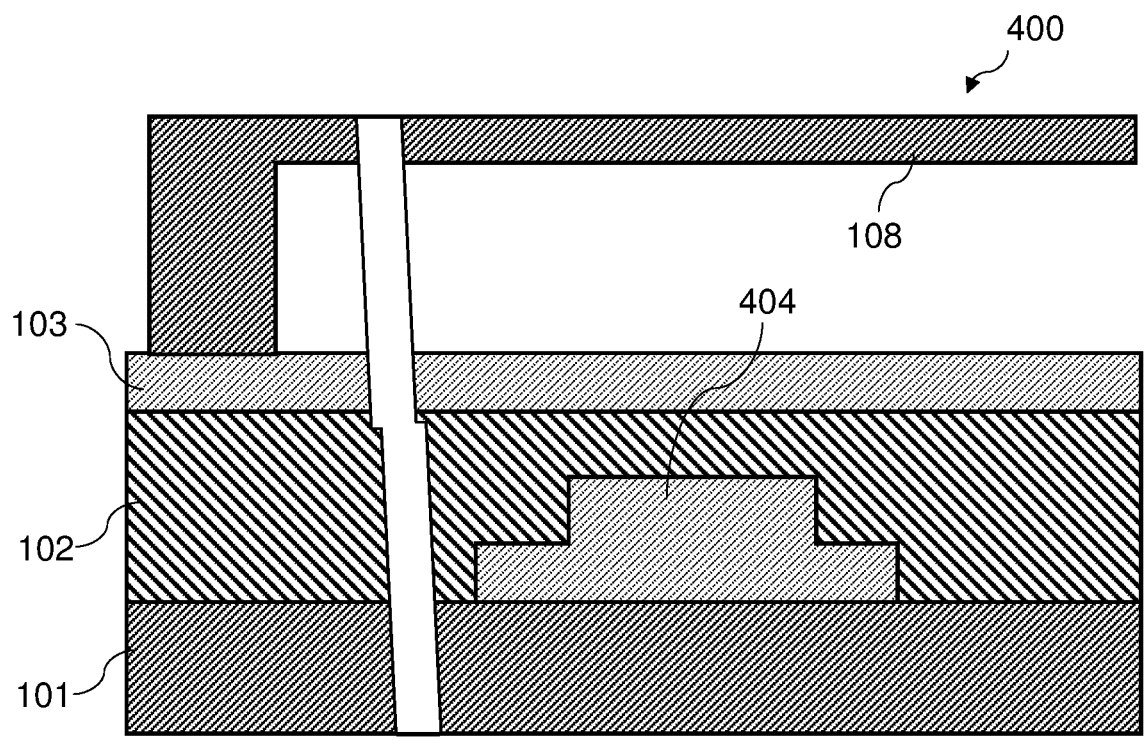

FIG. 3 and FIG. 4 are cross-sections akin to the cross-section of the photonic integrated circuit 100 of FIG. 2 obtained along the line II-II in FIG. 1, but illustrate different waveguide architectures for the first waveguide portion. In FIG. 3, the photonic integrated circuit 300 comprises a first waveguide portion that is configured as a ridge (or strip) waveguide 304. The height of the strip waveguide 304 may range between height 30 nm and 500 nm; a width of the strip waveguide 304 may vary from 100 nm to 5000 nm. In FIG. 4, the photonic integrated circuit 400 comprises a first waveguide portion that is configured as a rib waveguide 404. This rib waveguide 404 may have a height between 50 nm and 500 nm, a width between 100 nm and 5000 nm, a rib width between 100 nm and 2000 nm, and a rib height between 20 nm and 400 nm. Waveguide materials for the waveguides 304, 404 can be as previously described for the first embodiment.

Figure 10:
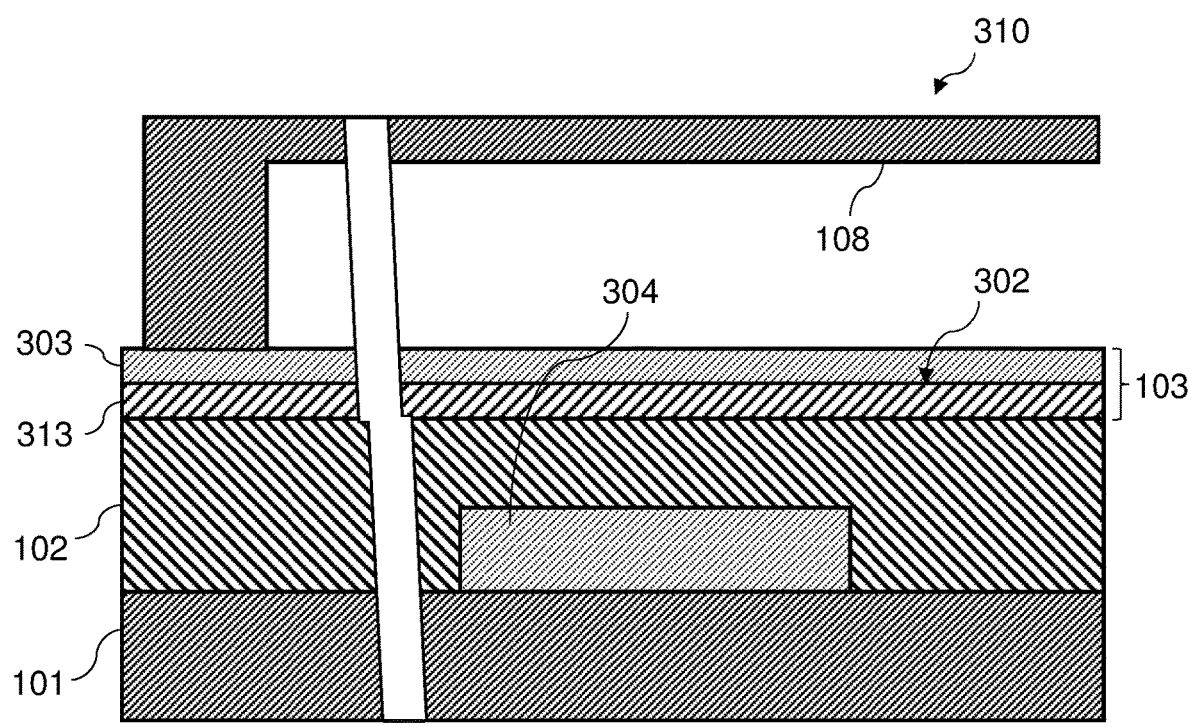
FIG. 10 is a cross-sectional view of a variant of the photonic integrated circuit illustrated in FIG. 3.

A cross-section of a variant of the photonic integrated circuit in FIG. 3 is shown in FIG. 10. The photonic integrated circuit 310 of FIG. 10 differs from the photonic integrated circuit 300 of FIG. 3 in that the blocking means 103 is a composite structure comprising a further porous layer 313, e.g. a mesoporous layer, which is provided on top of and directly contacting enrichment layer 102, and a functional coating 303 extending at least over the outer surface 302 of porous layer 313. The functional coating 303 preferably also extends into the pores of further porous layer 313 so as to cover substantially all internal pore surfaces. Typically, the internal pore surfaces pertaining to the enrichment layer 102 are provided with a functionally modified surface or coating that is distinct from the functional coating 303, i.e. it comprises different functional groups leading to different physicochemical properties of the pore surfaces (e.g. binding functionality versus protective functionality). For instance, the functional coating 303 on the outer surface 302 of the further porous layer 313, and preferably also on the inner pore surfaces of porous layer 313, is a hydrophilic coating, e.g. covalently bound PEG, lending antifouling properties to the outer surface 302, whereas the internal pore surfaces pertaining to the enrichment layer 102 are functionalized with an affinity coating (i.e. adsorbent phase), e.g. with acidic functional groups such as benzenesulfonic acid functionalization (e.g. 2.7 wt. % of sulfur in 6.2 nm sized pores (diameter) of mesoporous silica having about 0.6 g/cm$^3$ porosity and about 460 m$^2$/g of specific area), whose negative terminal charges promote strong electrostatic interaction with cationic compounds, e.g. cationic (peptide) antibiotics. In other words, the pore surface functionalization of the enrichment layer 102 increases the adhesion or immobilization/binding characteristics with respect to the therapeutic agent(s), whereby an enhanced enrichment therapeutic agent molecules and a stronger Raman sensing signal is obtained.

In the exemplary photonic integrated circuit 310, the porous layer 303 and the enrichment layer 102 may be formed integrally from the same material, e.g. mesoporous silica, resulting in a double-layered porous cladding structure with respect to the waveguide core 304. The effective refractive index relative to the further porous layer 303 (i.e. top layer of the cladding) may be the same as the effective refractive index relative to the enrichment layer 102 (i.e. bottom layer cladding), or may be smaller. The formation of the porous layer 303 and the enrichment layer 102 may be achieved by a two-step synthesis. In a first step the enrichment layer 102 (e.g. thinner than 1.0 μm, e.g. thinner than 500 nm, e.g. about 300 nm or thinner relative to the top surface of the waveguide core 304) is formed by a sol-gel process with removable template and its pore surfaces are functionalized such that substantially all available binding sites are occupied. During the subsequent second step, the further porous layer 303 (e.g. a few hundred nanometers thin layer or less, e.g. a layer thinner than 100 nm) is formed by a sol-gel process with removable template, too, and its outer surface 302 as well as its internal pore surfaces are functionalized with the coating 303. The previously functionalized pore surfaces of the enrichment layer 102 are not available anymore for functionalization by the coating 303. The resulting double-layered porous cladding structure with respect to the waveguide core 304 can thus be provided as a single mechanical structural unit with bifunctional surface modifications. This has the advantage of improving mechanical stability and robustness of the bifunctional (double-layered) porous cladding structure, which can be very thin, e.g. a few hundreds of nanometers only, without recourse to particular pairs of process-compatible functional groups. In contrast to previously described manufacturing processes for bifunctional mesoporous silica structures, which involve the surface modification of the porous silica with alkyl diol groups and subsequent cleavage of the alkyl groups at the outer surface by enzymes (e.g. Yu Wang, et al. "*Restricted access magnetic materials prepared by dual surface modification for selective extraction of therapeutic drugs from biological fluids*", Journal of Magnetism and Magnetic Materials, Volume 324, Issue 4, 2012), the bimodal phase (double-layered) porous cladding structure obtainable in the present embodiment are more universal in the sense that they allow for a wider range of dual surface functionalization by a combination of two functional groups and do not rely on specific enzymes, which makes the manufacture easier.

In embodiments of the invention, the waveguide of the first waveguide portion may be configured to confine and guide a particular type of mode, e.g. a TE or TM mode, to optimize mode overlap with the pores of the porous material enrichment layer and/or coupling efficiency for the inelastically scattered Raman light collected by the waveguide. For instance, the waveguide architecture (strip, rib, slotted waveguide) and geometry (width, height, etc.) may be adapted to achieve this goal. Spatial mode filters or mode converters may be provided along the waveguide. In the particular embodiments using a slotted waveguide in the first waveguide portion, a TE mode is generally more efficient in increasing the Raman response, whereas in embodiments that are using strip waveguides in the first waveguide portion a TM mode is preferred. The first waveguide portion may be configured to allow confinement and guiding of only one optical mode, e.g. a fundamental TE or TM mode.

In yet another embodiment of the invention, the first waveguide portion can be, or include, a free-standing waveguide or a waveguide that is partially suspended. This can be obtained by underetching the waveguide core. An advantage of a free-standing or partially suspended waveguide is that the liquid sample is allowed to flow in a direction traverse to the enrichment layer (and the photonic integrated circuit). A further advantage thereof is that the sensitive volume can be increased, thereby improving the Raman efficiency of the device. Yet other embodiments may provide a first waveguide portion for which the supporting substrate layer 101 has been locally or globally substituted by a porous material, which has the advantage of extending the porous material layer to both sides, top and bottom, of the first waveguide portion, and of allowing the liquid sample to flow in a direction traverse to the enrichment layer (and the photonic integrated circuit).

Figure 5:
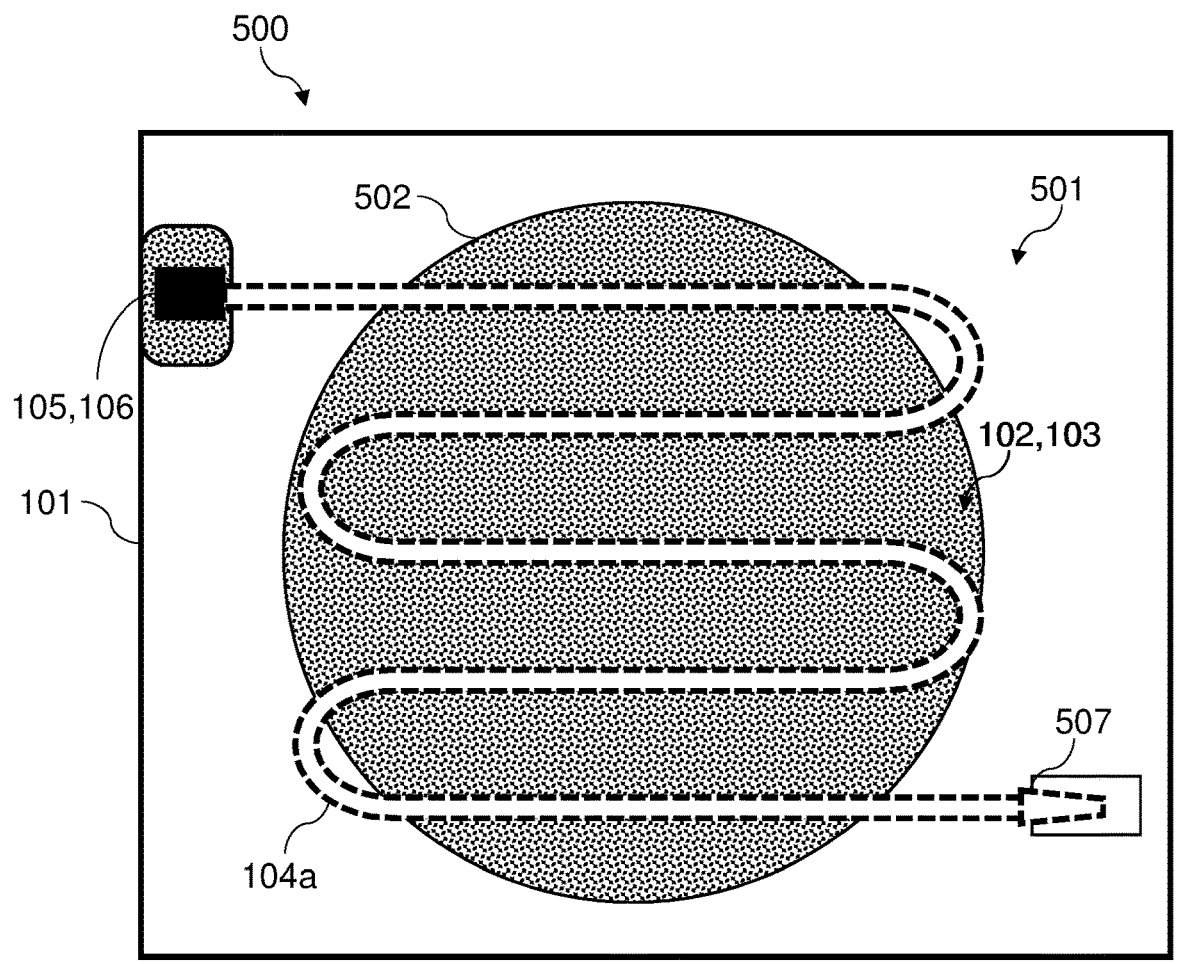
FIG. 5 is top view of a photonic integrated circuit according to a second embodiment of the invention.

FIG. 5 shows a second embodiment of a photonic integrated circuit 500. It differs from the first embodiment of FIG. 1 in that the enrichment layer 102 with blocking means 103, e.g. outer surface coating, extends over a larger portion of the surface area of the substrate 101, e.g. over the whole surface are of the substrate 101. Consequently, the waveguide may only comprise a single portion 104a and the tapered sections 107 can be omitted. However, it may be of advantage to terminate the waveguide portion 104a by an inverted taper structure 507 to avoid backreflections of illumination light from end facets. An encapsulating member 501 covers the enrichment layer 102 with blocking means 103, and may also cover the bottom and side faces of the photonic integrated circuit 500, e.g. fully encapsulate the circuit 500. An opening 502, e.g. a cylindrical hole or a smaller aperture serving as a fluid passageway to a larger sample chamber formed as a cavity in the member 501, is formed in the encapsulating member 501 such that a liquid sample is allowed to contact the enrichment layer 102 with blocking means 103 at the bottom side of the opening 502. An opening 502 may be shaped to receive a precise volume of the liquid sample if filled. Knowledge of the precise volume of the liquid sample is of advantage for determining a concentration by volume of the unbound portion of the at least one therapeutic agent. Depending on the type of light coupling means provided, the input and output port 105, 106 may be left covered (e.g. waveguide facet coupling), or may be accessible through an opening or recess in the member 501, and preferably also in the enrichment layer 102, at the location of the input and output ports (e.g. coupling prism or grating). A better accessibility via a hole or recess may have the further advantage that it may receive and secure an end portion of a fiber, which is used to deliver light from a light source to the circuit 500. It is further noted that the input port and output port may be provided as a single input-output port 105, 106 associated with only one light coupling structure (e.g. grating coupler or waveguide facet), provided that the photonic integrated circuit 500 is operated in reflection mode, i.e. the spontaneous Raman scattered light that is travelling backwards when being collected by the waveguide 104a, is coupled out of the waveguide via the input port too. This has the advantage that less direct light for illumination needs to be removed to isolate the Raman scattered components before detection, e.g. less noise will be detected at the output of an adequate edge or notch filtering device. Moreover, the encapsulating member 501 may be opaque and have light shielding properties to prevent external noise signals, e.g. streak light, from being collected by the waveguide 104a and subsequently analyzed.

Figure 6:
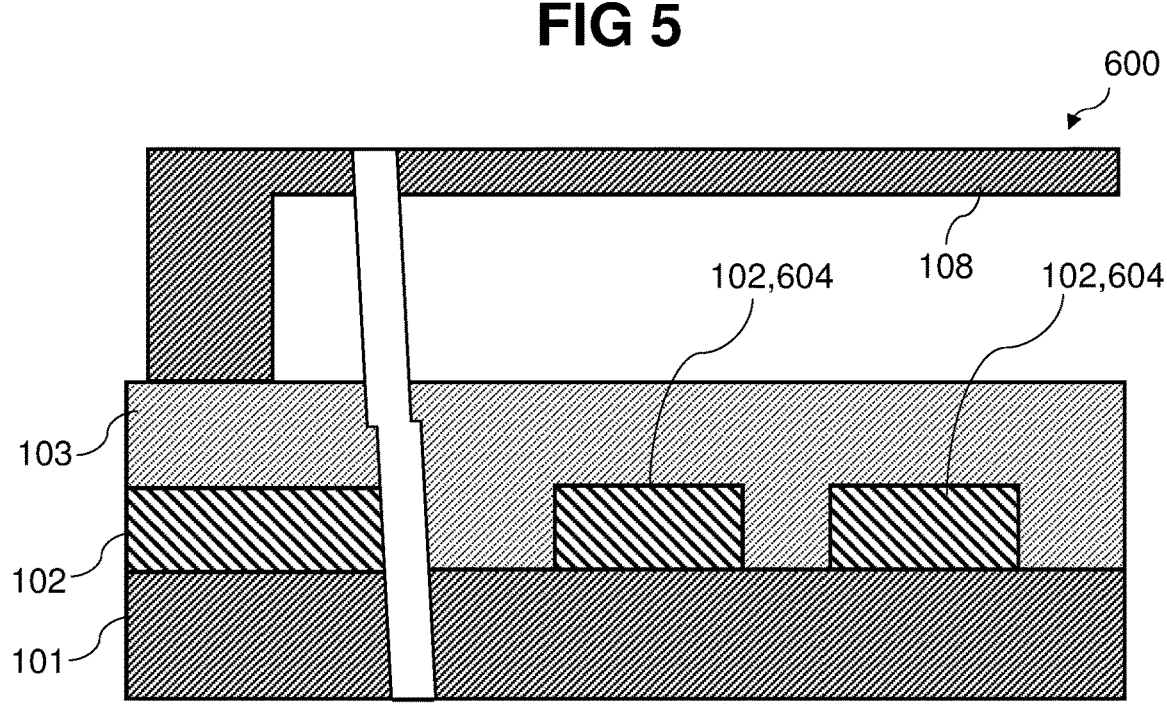
FIG. 6 is a cross-sectional view of a photonic integrated circuit according to a third embodiment of the invention.

FIG. 6 is a cross-sectional view of a photonic integrated circuit 600 according to a third embodiment. It differs from the previous embodiments in that the first waveguide portion 604, e.g. a slot waveguide, is formed directly in the porous material layer 102, e.g. patterned into enrichment layer 102 by known lithography and etching techniques. In this particular embodiment, the blocking means 103, e.g. hydrophilic coating, in contact with the outer surface of enrichment layer 102, acts as a upper cladding layer for the waveguide 604, and the unbound portion of the at least one therapeutic agent is enriched within the waveguide core itself, e.g. by adsorption on the internal pore surfaces of the porous-core waveguide 604. The porous-core waveguide may have increased light-matter interaction properties, because not the evanescent tail of the at least one guided optical mode of the waveguide is overlapping with the pores, but the center portion, e.g. the confined part, of the guided optical mode that typically carries higher optical powers. Only the waveguide-defining portion of the enrichment layer 102,604 may receive a liquid sample at its outer surface, e.g. via a microfluidic channel 108.

Figure 7:
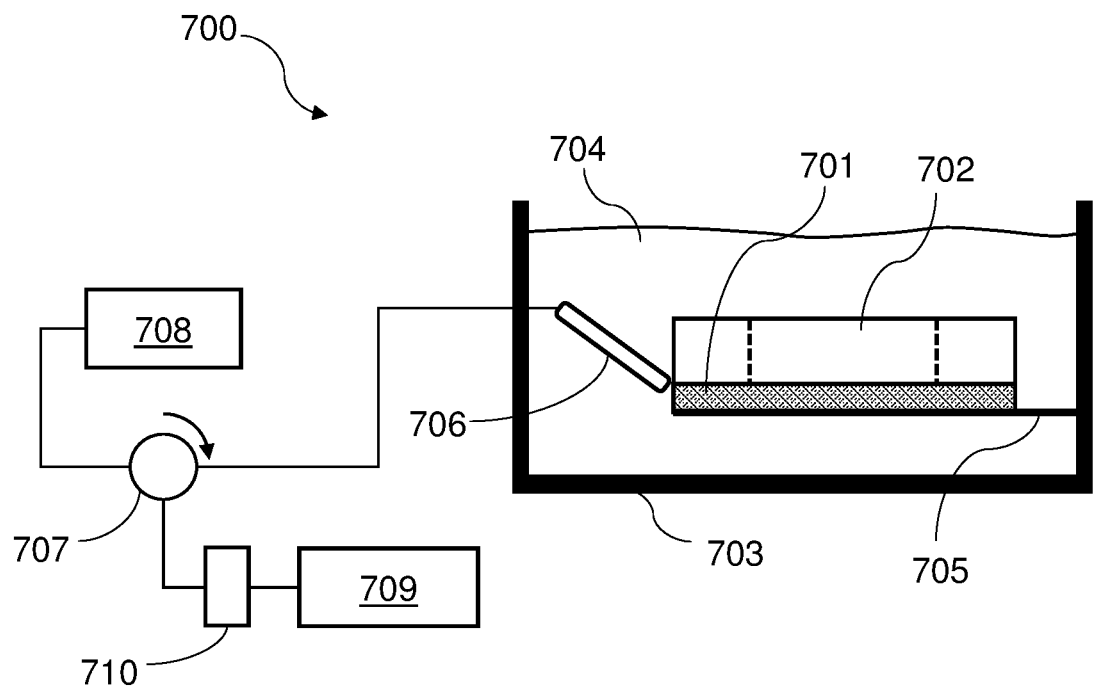
FIG. 7 and FIG. 8 are illustrating Raman spectroscopy systems comprising a photonic integrated circuit according to embodiments of the invention.
Figure 8:
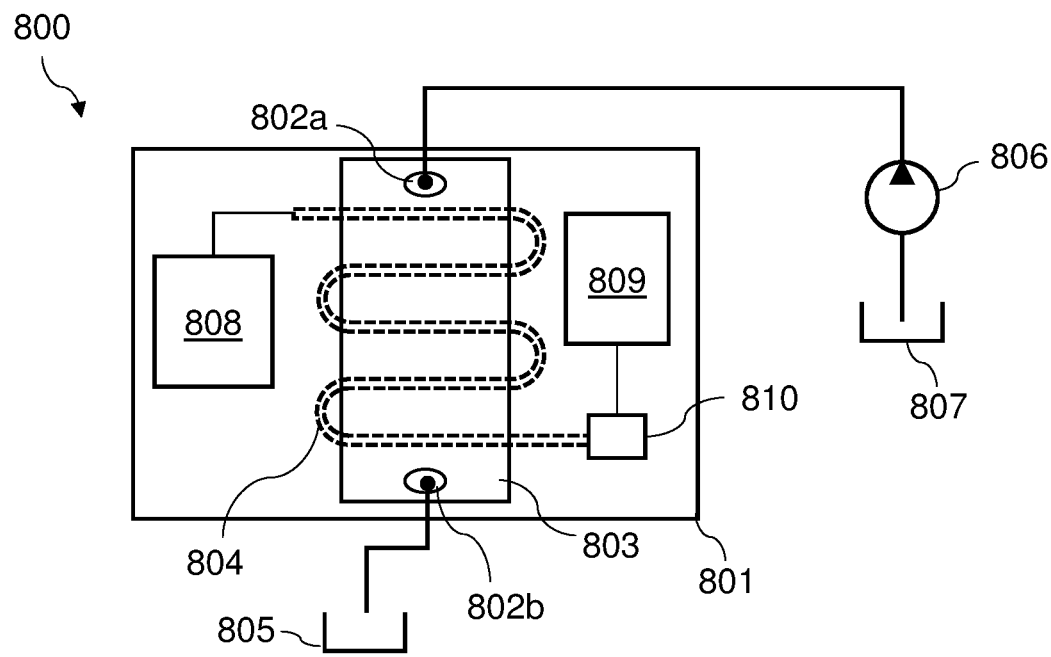

FIG. 7 and FIG. 8 illustrate two different Raman sensing systems comprising a photonic integrated circuit according to embodiments of the invention. In FIG. 7, the Raman sensing system 700 comprises a photonic integrated circuit 701 of the kind already described in respect of the second embodiment of FIG. 4. A cavity or sample chamber 702 formed in an encapsulating member allows the liquid sample 704 to be contacted with the outer surface of the enrichment layer with blocking means. The photonic integrated circuit 701 is immersed into the liquid sample 703 filling a sample container 703, and is further held in position by a holding member 705, e.g. a chip holder or slide holder with an elongated arm portion coupled to a container wall. Instead of immersing the photonic integrated circuit 701 into the sample container 703 containing the liquid sample 704, a liquid sample dispensing system, e.g. a pipette or a valve-controlled nozzle, may be provided for filling the sample chamber 702, which may be designed to contain a precise sample volume. Illumination light from a light source 708 is delivered to an input port of the photonic integrated circuit 701, e.g. by using a fiber-based light delivery system. A fiber end portion 706, e.g. lensed fiber, or any other suitable light coupling element, is used to couple the delivered light for illumination into the photonic integrated circuit 701. The fiber end portion 706 may be part of a larger fiber array if several measurements are performed in parallel, e.g. for different liquid samples provided by a liquid sample dispensing system. Moreover, the fiber end portion may be mounted into a fiber or fiber array holder (not shown) which allows alignment of the fiber end portion relative to the circuit 701. Alternatively, fiber end portion 706 may be firmly attached to the circuit 701, e.g. permanently attached thereto by gluing. A circulator 707 is arranged between the light source 708 and the fiber end portion 706 and between the fiber end portion and a Raman spectrometer 709. Thus scattered backpropagating light collected by the first waveguide portion (reflection mode operation) is directed to the spectrometer 709 and does not return to the light source 708. A wavelength filter 710, e.g. a notch filter or an edge filter, is arranged in the light path leading to the spectrometer 709, e.g. in front of the spectrometer 709 entrance aperture. Using the wavelength filter 710 has the advantage that residual illumination light arising from reflective interfaces is blocked to not interfere with the Raman spectrum measurement in the spectrometer 709. In addition thereto, elastically scattered Rayleigh light, which is also collected by the first waveguide portion of the circuit 701, is also strongly suppressed by the filter 710, avoiding an overexposure of the spectrometer 709. The wavelength filter 710 can also be a part of the spectrometer 709. Light source 708 and/or the wavelength filer 710 may be wavelength-tunable to obtain a good alignment of the wavelength filter rejection band with the light source emission wavelength used for illumination as well as good alignment of the wavelength filter pass band with the Raman shifted wavelengths, e.g. the Raman modes of the Raman spectrum.

In FIG. 8, the Raman sensing system 800 comprises a photonic integrated circuit 801 of the kind already described in respect of the first embodiment of FIG. 1. A light source 808 for illumination of the first waveguide portion 804, and the enrichment layer containing the unbound portion of the pore surface adsorbed at least one therapeutic agent, is provided on the same substrate of the photonic integrated circuit 801. Further, wavelength filter 810 and optical spectrometer 809 are also provided on the same substrate of the photonic integrated circuit 801, e.g. are fully integrated system components. The light source 808 is optically coupled to the first waveguide portion 804 such that illumination light generated by the light source 808 is delivered to a first end of the first waveguide portion 804. A second end of the first waveguide portion 804 is optically connected to the integrated spectrometer 809 via the wavelength filter 810. Hence, forward scattered light, comprising Rayleigh scattered and inelastically Raman scattered photons, is collected, in transmission mode, in the same waveguide portion 804, before being input to the wavelength filter 810. At the output of the wavelength filter 810, the filtered scattered light only contains the inelastically scattered wavelengths (Raman spectrum), effectively removing the Rayleigh scattered light at the same wavelength as the illumination light emitted by the light source. A microfluidic channel 803 is overlaying at least a portion of the sensitive volume of the circuit 801, e.g. is overlaying at least a portion of the waveguide portion 804 formed in or extending through the enrichment layer. Input and output ports 802a, 802b, e.g. inlet and outlet, are provided at opposite ends of the microfluidic channel 803 to allow the liquid sample to enter and exit the channel 803, respectively. The bottom of the fluidic channel 803 is in fluid communication with the enrichment layer's outer surface with blocking means, whereby the liquid sample can be contacted with the photonic integrated circuit 801, and more specifically with the outer surface of the enrichment layer which has blocking means provided thereon. The liquid sample comprising a bodily fluid with one or more endogenous components and at least one therapeutic agent is contained in a fluid reservoir 807 that is in fluid communication with the inlet 802a of the fluidic channel 803 via a pump 806. The liquid sample exiting the outlet 802b of the fluidic channel 803 is drained towards a further reservoir 805. The two fluid reservoirs 807, 805 may be provided as a single reservoir in some embodiments. Moreover, the fluid reservoirs 807, 805 and the pump 806 may be integrated on a same microfluidic chip or cartridge. Additional, well-known elements for controlling the flow of the liquid sample, such as control valves, may be present in some embodiments.

The light for illumination, emitted by light source 708, 808, is preferably generated by a monochromatic laser source, e.g. a solid state laser source such as diode laser or VCSEL, having a spectral linewidth of less than 1 nm. Laser sources emitting laser light having broader emission bandwidth may be used in combination with suitable wavelength filtering devices. As inelastic Raman scattering is a non-resonant scattering process, the laser line may be at any wavelength with photon energy exceeding vibrational energies of the therapeutic agents of interest. Common emission wavelengths used for illumination of the first waveguide portion waveguide may range between 300 nm and 1200 nm, at which wavelengths the first waveguide portion is substantially transparent, e.g. a silicon nitride based waveguide portion. Laser light, continuous wave or pulsed, may be used for illumination, wherein typical average power levels in the first waveguide portion are ranging from 0.1 mW to 500 mW. Preferably the first waveguide portion has itself a low Raman signal contribution, e.g. a silicon nitride based waveguide portion of high material purity.

Figure 9:
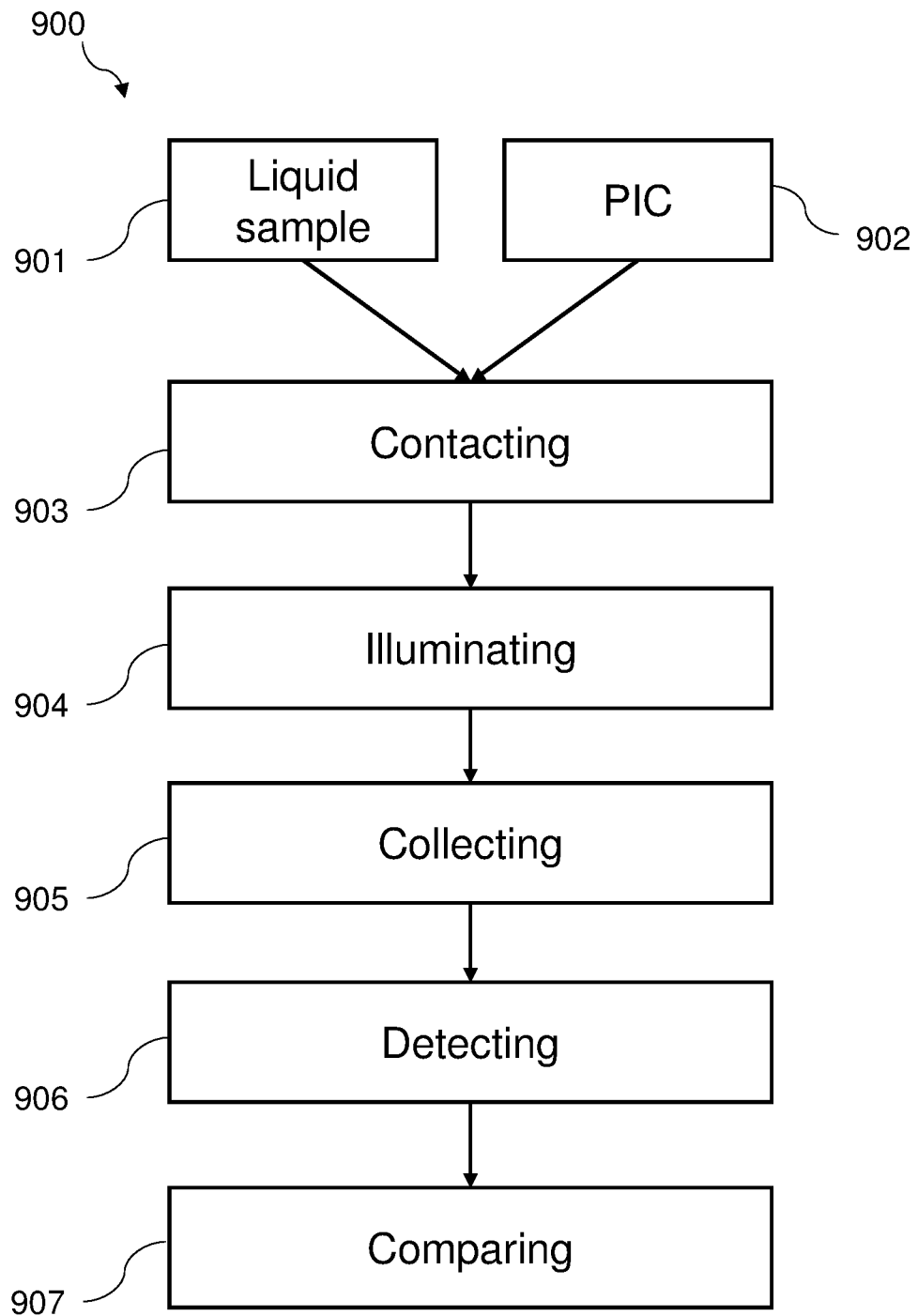
FIG. 9 is a flow diagram explaining the steps of a detection method for an unbound portion of a therapeutic agent, in accordance with embodiments of the invention.

A method for detecting the presence of an unbound portion of at least one therapeutic agent according to one aspect of the invention is now described with reference to FIG. 9. The Raman spectroscopy systems referred to in FIG. 7 and FIG. 8 may be used to carry out the method, but the method is not limited to these specific systems. The method 900 comprises providing a liquid sample 901, and providing 902 a photonic integrated circuit (PIC) in accordance with embodiments of the invention. The liquid sample includes a bodily fluid and at least one therapeutic agent. Examples of bodily fluids are, without being limited thereto, whole blood, blood plasma or serum, sputum, saliva, condensed exhaled air, tears, urine, interstitial fluid. Typical therapeutic agents of interest, e.g. in drug monitoring applications, may comprise one or more of the following: antibiotics, in particular beta-lactam antibiotics, antiepileptics, immunosuppressants, cardioactive drugs, antifungal drugs, sedatives, psychotherapeutics, chemotherapeutics, anticonvulsants, analgesics, anesthetics.

One or more bodily fluids may be mixed together to obtain a liquid sample. A bodily fluid may be obtained from a human or an animal. Optional liquid sample preparation steps may include addition of a solvent (e.g. a pH-buffer solution), a solvent and a surfactant, diluting the bodily fluid with water, temperature treating the liquid sample (e.g. heating). In addition thereto, a trace molecule may be added as an internal standard for calibration purposes. The addition of a pH-buffer solution as a solvent has the advantage that the pH value of the liquid sample is kept at a predetermined value, e.g. a predetermined pH-value for which protein conformations and sizes are known from experiment or literature. Adding a surfactant, e.g. Pluronic L31 or Triton X100, to the liquid sample is beneficial for obtaining better wettability properties of the liquid sample during delivery to the sensitive volume of the photonic integrated circuit and during imbibition of the enrichment layer, and if present, also the porous blocking layer.

In a next step 903, the liquid sample is contacted with the PIC, more specifically, the liquid sample is received at the outer surface of the enrichment layer with blocking means. This step may comprise delivering the liquid sample from a reservoir to an inlet of a microfluidic channel, e.g. by pumping, wherein the microfluidic channel is in fluid communication with the outer surface of the enrichment layer of the PIC. Further, the flow of the received liquid sample may be directed through the microfluidic channel before draining the liquid sample to a further collection reservoir. The liquid sample flow through the microfluidic channel may be oriented parallel to the enrichment layer or may traverse the enrichment layer perpendicularly. The microfluidic channel may be filled to act as a sample chamber, the flow through the channel being stopped during the Raman spectrum acquisition. Alternatively, the step 903 may comprise immersing the PIC into the liquid sample, or filling (e.g. pipetting) a sample chamber integrally formed with the PIC with the liquid sample. Only a predetermined volume of the liquid sample may be contacted with the PIC during the contacting step 903. The contacting step 903 may be preceded by a rinsing step in which water or an organic solvent is contacted with the PIC to cause desorption of any substances initially adsorbed on the internal surfaces of the porous enrichment layer, e.g. remaining adsorbed therapeutic agents of a previous measurement if the same PIC is reused.

In a subsequent step 904, the PIC with the contacted liquid sample is illuminated. Before illumination, a predetermined time interval may pass to allow the contacted liquid sample to selectively permeate the pores of the enrichment layer by capillary action, e.g. the at least one therapeutic agent in its unbound condition permeates the pores, but not the endogenous components that are too large in size compared to the pore width of the enrichment layer (blood cells, proteins such as fibrinogen, etc.). The illumination step 904 leads to illumination of the waveguide that is formed in the enrichment layer as well as of the pores of the enrichment layer that surround the waveguide core or of which the waveguide core is composed. Hence, also the unbound portion of the at least one therapeutic agent that has been adsorbed on the internal pore surfaces of the illuminated pores (enrichment) is illuminated. Enhanced light-matter interaction, in the form of inelastic Raman scattering events, takes place along the waveguide (i.e. enhanced interaction volume) and within the sensitive volume of the PIC. Light guided by the waveguide is scattered inelastically (and also elastically) by the pore surface-adsorbed at least one therapeutic agent.

The illumination step 904 may comprise emitted light for illumination by a monochromatic light source, e.g. a laser light source or filtered light source, and delivered the emitted light to the PIC, e.g. to an input port thereof, where it is coupled into the waveguide by any suitable coupling means. The illumination light so coupled to the waveguide of the PIC is then guided to the sensitive volume of the PIC, where the waveguide is covered by the porous material layer or is formed in the porous material layer. The wavelength of the illumination light may range, for example, between 300 nm to 1200 nm, i.e. may be selected from the visible or near infrared spectral region.

In a next step 905, a fraction of the scattered light, in particular Raman scattered light, is collected by the waveguide in the sensitive volume of the PIC. Then, the collected scattered light that is propagating in a forward and/or backward direction of the waveguide is coupled out of the PIC, depending on the number of input/output ports of the PIC.

In a detecting step 906, the Raman spectrum of the collected scattered light is detected, e.g. in an optical spectrometer onto which the collected scattered light from the PIC waveguide is directed. The detected Raman spectrum comprises various Raman modes, e.g. molecular vibrations, of the at least one therapeutic agent in its unbound condition. The Raman modes of the pore surface adsorbed therapeutic agents may be slightly shifted with respect to a non-adsorbed therapeutic agent. This effect can be accounted for in a calibration step. Preferably, the detecting step 906 also includes a wavelength filtering step which rejects the otherwise detected unscattered illumination light carried by the waveguide of the PIC as well as the elastically (Rayleigh) scattered light collected by the waveguide of the PIC. A Raman spectrum may be detected in the range from 200 $cm^{-1}$ up to 3500 $cm^{-1}$.

In a comparing step 907, the signal strength of at least one Raman mode in the detected Raman spectrum, indicative of the at least one therapeutic agent, is compared to a predetermined threshold value. The wavelength locations of the at least one Raman mode may be obtained from experiment, e.g. during an initial method and device calibration, which measure Raman spectra at known concentrations of the at least one therapeutic agent. The signal strength of the Raman mode may correspond to a peak signal or the integrated line strength (area under peak) of the Raman mode under consideration. The predetermined threshold value may correspond to a previously measured limit of detection for the at least one therapeutic agent, e.g. the minimum concentration of the at least one therapeutic agent for which the associated at least one Raman mode is observed at a significant level (e.g. 3 sigma) above the noise floor. Several Raman modes may be tested for comparison during the step 907. A background Raman signal may be subtracted from the detected Raman spectrum prior to the comparing step 907, wherein the background Raman signal is obtained by detecting the Raman spectrum for the same PIC under similar measurement conditions, but without having the liquid sample contacted the PIC. Depending on whether the signal strength exceeds the predetermined threshold value or not, the presence or absence of the at least one therapeutic agent is indicated as a measurement outcome.

The above described method may be carried out simultaneously for a plurality of different therapeutic agents. Raman modes indicative of each one of the plurality of therapeutic agents may be compared to corresponding predetermined reference (threshold) values to detect the presence or absence thereof. If the individual Raman modes associated with distinct therapeutic agents start overlapping, a blind source separation and deconvolution algorithm to separate the compound Raman spectrum into a collection of therapeutic agent specific Raman spectra, the signal strengths of modes of which can then be compared to the reference values independently from each other.

Moreover, the method 900 may be adapted to also measure volume concentrations of the at least one therapeutic agent in its unbound condition in the liquid sample, e.g. for drug monitoring applications. This can be achieved by using the measured signal strength of at least one Raman mode indicative of the at least one therapeutic agent as an input to a calibration model to obtain the corresponding volume concentration as model output. The calibration model relates signal strengths to volume concentrations; it is constructed based on reference liquid samples with different predetermined volume concentrations of the at least one therapeutic agent for which the measured signal strengths in the corresponding detected Raman spectra has been recorded. A calibration model may be constructed as a look-up table, and may use interpolation between two previously measure signal strength, or may be constructed as parametric model, e.g. a linear, quadratic, or power law functional relationship between Raman mode signal strength and volume concentration. One possible parametric model is the Freundlich model, in which the model parameters (affinity coefficient and nonlinearity coefficient) are fitted to to the calibration data obtained from measured reference samples. Other more complex models, e.g. machine learning algorithms, may be used instead.

The volume concentration detection can be extended to a plurality of therapeutic agents in parallel. Again, the compound Raman spectrum may be decomposed (e.g. using blind deconvolution) into a plurality of individual therapeutic agent specific spectra, which can be treated independently of each other. Alternatively, the volume concentration corresponding to signal strength of a number of preselected Raman modes, e.g. three to thirty Raman modes that are indicative for the plurality of therapeutic agents, may be predicted with high fidelity directly from the compound Raman spectrum if a pretrained prediction model such as partial least squares or principal component regression is used. Such a prediction model may be pretrained during calibration, in which a large number of reference liquid samples is contacted with the PIC and the corresponding reference Raman spectrum is recorded, and wherein the reference liquid samples are comprising known concentrations of each of the plurality of therapeutic agents (e.g. including reference samples of only one therapeutic agent as well as of mixtures of therapeutic agents). The projection matrices for partial least squares, for instance, are then obtained using the known volume concentrations and the reference Raman spectra.

An added trace molecule in the liquid sample can be used as an internal standard for calibration. The volume concentration of the trace molecule being a known quantity, the signal strength obtained from a Raman mode identifiable with the trace molecule allows one to relate the relative signal strengths measured for the one or more therapeutic agents to absolute volume concentrations of the unbound portions of these therapeutic agents in the liquid sample.

Although embodiments of the invention are directed to the detection of therapeutic agents in bodily fluids, the herein described embodiments relating to the photonic integrated circuit may also be used for sensing of analytes in other complex fluids, e.g. analytes like metal complexes or organic compounds in waste water.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

The invention claimed is:

1. A method for detecting the presence of an unbound portion of therapeutic agents in a bodily fluid sample, not bound to proteins if present in the bodily fluid sample, comprising:
providing a liquid sample comprising a bodily fluid and an unbound portion of a therapeutic agent, the bodily fluid comprising at least one endogenous component having a geometrical size larger than a geometrical size of the therapeutic agent,
providing a photonic integrated circuit comprising a porous material enrichment layer, a non-planar waveguide formed at least partially in the enrichment layer and having a waveguide core of finite width, and a blocking means provided on an outer surface of the enrichment layer,
wherein the enrichment layer with blocking means is selectively permeable to facilitate penetration of the unbound portion of the therapeutic agent,
wherein the waveguide is configured to confine light in two transverse directions orthogonal to a direction of propagation of the light guided by the waveguide, induce light-matter interaction between light guided in at least one optical mode of said waveguide and the unbound portion of the therapeutic agent in the enrichment layer, and collect scattered light, resulting from said light-matter interaction, in said waveguide, and
wherein the blocking means is configured to cooperate with the enrichment layer to maintain therapeutic agent access to pores of the enrichment layer and prevent light-matter interaction between the at least one endogenous component and light guided in the waveguide, by hindering an adhesion of said endogenous component to a liquid-receiving surface of the enrichment layer with blocking means, which liquid-receiving surface is adapted for contacting the liquid sample,
contacting the liquid sample with the photonic integrated circuit,
illuminating an unbound portion of the therapeutic agent in the enrichment layer by supplying light to the waveguide, wherein light scattered by the therapeutic agent, in response to said illumination, is collected in the waveguide,
detecting a plurality of inelastic Raman scattering components in a power spectrum of the light collected by the waveguide,
comparing a spectral line strength of at least one of the plurality of inelastic Raman scattering components obtained for the therapeutic agent, to a predetermined threshold value to determine the presence of the unbound portion of the therapeutic agent.

2. The method according to claim 1, wherein the step of providing the liquid sample further comprises mixing a bodily fluid sample with a solvent, and/or obtaining a purified bodily fluid sample, and/or adding a calibration agent to the liquid sample.

3. The method according to claim 1, wherein the provided liquid sample comprises a plurality of therapeutic agents and at least one endogenous component of geometrical size larger than a geometrical size of each of the plurality of therapeutic agents, wherein the steps of illuminating, collecting, detecting, and comparing are performed for each of the plurality of therapeutic agents simultaneously.

4. The method according to claim 3, further comprising the step of decomposing a composite Raman spectrum, corresponding to the plurality of inelastic Raman scattering components obtained for the plurality of therapeutic agents, into a plurality of weighted reference spectra, to determine a relative contribution of each therapeutic agent of the plurality of therapeutic agents to the composite Raman spectrum,
wherein for each one of said plurality of therapeutic agents a reference spectrum has been previously obtained with respect to a liquid sample comprising only that therapeutic agent.

5. The method according to claim 1, further comprising the step of applying a spectral line strength of at least one of the plurality of inelastic Raman scattering components obtained for a therapeutic agent as input to a calibration model to determine a concentration of the unbound portion of that therapeutic agent in the liquid sample, said calibration model relating said line strength to a corresponding concentration of that therapeutic agent in the liquid sample and taking a diffusion of the unbound portion of the therapeutic agent into the porous material enrichment layer into account.

6. The method according to claim 1, wherein internal surfaces of the porous material enrichment layer are metal coated, in contact with metallic nanocrystals, or functionally coated for reversibly or irreversibly attaching thereto the unbound portion of the therapeutic agent.

7. The method according to claim 1, wherein the blocking means comprises:
 a further porous material layer, overlaying and contacting the enrichment layer, and comprising pores of different width as compared to pores of the enrichment layer, or
 a modified portion of at least the outer surface of the enrichment layer, wherein said modified portion comprises a hydrophilic coating, or
 a further porous material layer overlaying and contacting the enrichment layer, and an outer surface of said further porous material layer including a surface-functionalized portion.

8. The method according to claim 1, wherein the step of contacting further comprises flowing the liquid sample over the waveguide, flowing the liquid sample across the waveguide, or immersing the photonic integrated circuit into the liquid sample.

9. The method according to claim 1, wherein the photonic integrated circuit further comprises a flow channel for contacting a predetermined volume of a liquid sample with the photonic integrated circuit, the flow channel overlaying or crossing the waveguide of the photonic integrated circuit to direct a flow of the liquid sample along, respectively across the waveguide.

10. The method according to claim 1, wherein the bodily fluid comprises at least one of the groups consisting of urine, saliva, sputum, whole blood, blood plasma, serum, interstitial fluid, tears, condensed exhaled air.

11. The method according to claim 1, wherein therapeutic agents comprise at least one of the groups consisting of antibiotics, antiepileptics, immunosuppressants, cardioactive drugs, antifungal drugs, sedatives, psychotherapeutics, chemotherapeutics, anticonvulsants, analgesics, anesthetics.

12. An integrated photonic circuit for assisting in the detection of the presence and/or concentration of an unbound portion of therapeutic agents in a bodily fluid sample, not bound to proteins if present in the bodily fluid, the bodily fluid further comprising at least one endogenous component having a geometrical size larger than a geometrical size of the therapeutic agent, the integrated photonic circuit comprising:
 a mesoporous material enrichment layer,
 a non-planar waveguide formed at least partially in the enrichment layer, the non-planar waveguide having a waveguide core of finite width, and
 a blocking means provided on an outer surface of the enrichment layer,
 wherein the enrichment layer with blocking means is configured to be permeable to the unbound portion of the therapeutic agent,
 wherein the waveguide is configured to confine light in two transverse directions orthogonal to a direction of propagation of the light guided by the waveguide, induce light-matter interaction between light guided in at least one optical mode of said waveguide and the unbound portion of the therapeutic agent in the enrichment layer, and collect scattered light, resulting from said light-matter interaction, in said waveguide, and
 wherein the blocking means is configured to cooperate with the enrichment layer to maintain therapeutic agent access to pores of the enrichment layer and prevent light-matter interaction between the at least one endogenous component and light guided in the waveguide, by hindering an adhesion of said endogenous component to a liquid-receiving surface of the enrichment layer with blocking means, which liquid-receiving surface is adapted for contacting the bodily fluid sample.

13. The integrated photonic circuit according to claim 12, wherein the enrichment layer is patterned to define the waveguide as a mesoporous material waveguide, or wherein the enrichment layer is a cladding to the waveguide and overlaying a core of the waveguide such that the at least one optical mode of the waveguide extends into said enrichment layer.

14. The integrated photonic circuit according to claim 12, wherein the blocking means comprises a further porous material layer overlaying and contacting the enrichment layer, and an outer surface of said further porous material layer including a surface-functionalized portion.

15. The integrated photonic circuit according to claim 14, wherein the surface-functionalized portion of the further porous material layer extends inwardly from the outer surface and through the further porous material layer,
 wherein the surface-functionalized portion also includes internal pore surfaces of the further porous material layer.

16. The integrated photonic circuit according to claim 15, wherein internal pore surfaces of the enrichment layer comprise a surface functionalization distinct from a surface functionalization of the surface-functionalized portion of the further porous material layer.

17. The integrated photonic circuit according to claim 16, wherein the surface functionalization of the surface-functionalized portion of the further porous material layer is a hydrophilic coating and the surface functionalization of the internal pore surfaces of the enrichment layer is an affinity coating for binding the therapeutic agent.

18. The integrated photonic circuit according to claim 12, wherein the blocking means comprises:
 a modified portion of the outer surface of the enrichment layer, said modified portion comprising a hydrophilic coating, or
 a further porous material layer, overlaying and contacting the enrichment layer, and comprising pores of different width as compared to the mesopores of the enrichment layer.

19. The integrated photonic circuit according to claim 12, wherein pores of the enrichment layer have pore diameters between 2 nm and 50 nm.

20. The integrated photonic circuit according to claim 12, wherein the porous material enrichment layer comprises a network of connected mesopores and/or an array of isolated mesopores.

* * * * *